United States Patent
Keough et al.

(10) Patent No.: US 11,982,390 B2
(45) Date of Patent: May 14, 2024

(54) ADHESIVE TRANSFER HOSE HAVING A BARRIER LAYER AND METHOD OF USE

(71) Applicant: NORDSON CORPORATION, Westlake, OH (US)

(72) Inventors: Jim Keough, Cumming, GA (US); Leslie J. Varga, Cumming, GA (US); Laurence B. Saidman, Duluth, GA (US); Wes Fort, Cumming, GA (US); Jay Lanier, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 661 days.

(21) Appl. No.: 15/632,371

(22) Filed: Jun. 25, 2017

(65) Prior Publication Data

US 2018/0017200 A1    Jan. 18, 2018

Related U.S. Application Data

(60) Provisional application No. 62/363,138, filed on Jul. 15, 2016.

(51) Int. Cl.
*F16L 53/38* (2018.01)
*B32B 1/08* (2006.01)
(Continued)

(52) U.S. Cl.
CPC .............. *F16L 53/38* (2018.01); *B32B 1/08* (2013.01); *B32B 3/28* (2013.01); *B32B 5/024* (2013.01); *B32B 5/26* (2013.01); *B32B 7/04* (2013.01); *B32B 15/085* (2013.01); *B32B 15/14* (2013.01); *B32B 15/18* (2013.01); *B32B 15/20* (2013.01);
(Continued)

(58) Field of Classification Search
CPC .............. F16L 53/38; B32B 1/08; B32B 3/28
USPC .......... 392/472, 473, 465, 479; 222/52, 133, 222/146.2
See application file for complete search history.

(56) References Cited

U.S. PATENT DOCUMENTS 2,449,369 A   9/1948   Doane et al.
2,809,268 A   10/1957  Heron
(Continued)

FOREIGN PATENT DOCUMENTS

CH   680815 A5    11/1992
CN   2765033 Y    3/2006
(Continued)

OTHER PUBLICATIONS

Technical Data; http://www.junkosha.co.jp/technical/tec8.html; Junkosha Inc.; accessed Feb. 3, 2018; 3 pages.
(Continued)

*Primary Examiner* — Nathaniel E Wiehe
*Assistant Examiner* — Thomas J Ward
(74) *Attorney, Agent, or Firm* — BakerHostetler

(57) ABSTRACT

A multi-layered hot melt adhesive transfer hose is provided. The transfer hose has a barrier layer that prevents or minimizes the ingress of oxygen and other gases into a conduit of the hose. The transfer hose has at least one structural layer overlaying an exterior surface of the barrier layer to help the hose withstand a high fluid pressure. The barrier layer prevents the hot melt adhesive being transported in the hose from discoloring and charring when the adhesive is heated from about 250° F. up to and including 450° F. for an extended period of time.

28 Claims, 18 Drawing Sheets

(51) Int. Cl.

| | | |
|---|---|---|
| *B32B 3/28* | (2006.01) | |
| *B32B 5/02* | (2006.01) | |
| *B32B 5/26* | (2006.01) | |
| *B32B 7/04* | (2019.01) | |
| *B32B 15/085* | (2006.01) | |
| *B32B 15/14* | (2006.01) | |
| *B32B 15/18* | (2006.01) | |
| *B32B 15/20* | (2006.01) | |
| *B32B 23/08* | (2006.01) | |
| *B32B 23/20* | (2006.01) | |
| *B32B 27/08* | (2006.01) | |
| *B32B 27/12* | (2006.01) | |
| *B32B 27/18* | (2006.01) | |
| *B32B 27/20* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/38* | (2006.01) | |
| *B32B 27/42* | (2006.01) | |
| *F16L 11/08* | (2006.01) | |
| *F16L 11/12* | (2006.01) | |
| *H05B 3/58* | (2006.01) | |
| *F16L 11/04* | (2006.01) | |
| *F16L 11/127* | (2006.01) | |

(52) U.S. Cl.
CPC .............. *B32B 23/08* (2013.01); *B32B 23/20* (2013.01); *B32B 27/08* (2013.01); *B32B 27/12* (2013.01); *B32B 27/18* (2013.01); *B32B 27/20* (2013.01); *B32B 27/302* (2013.01); *B32B 27/304* (2013.01); *B32B 27/322* (2013.01); *B32B 27/34* (2013.01); *B32B 27/36* (2013.01); *B32B 27/38* (2013.01); *B32B 27/42* (2013.01); *F16L 11/08* (2013.01); *F16L 11/085* (2013.01); *F16L 11/12* (2013.01); *H05B 3/58* (2013.01); *B32B 2250/05* (2013.01); *B32B 2255/10* (2013.01); *B32B 2255/205* (2013.01); *B32B 2262/0269* (2013.01); *B32B 2262/101* (2013.01); *B32B 2262/103* (2013.01); *B32B 2264/102* (2013.01); *B32B 2264/104* (2013.01); *B32B 2264/105* (2013.01); *B32B 2264/12* (2013.01); *B32B 2307/308* (2013.01); *B32B 2307/50* (2013.01); *B32B 2307/546* (2013.01); *B32B 2307/714* (2013.01); *B32B 2307/7242* (2013.01); *B32B 2307/7244* (2013.01); *B32B 2597/00* (2013.01); *F16L 2011/047* (2013.01); *F16L 11/127* (2013.01)

(56) References Cited

U.S. PATENT DOCUMENTS

| | | | |
|---|---|---|---|
| 3,318,337 | A | 5/1967 | Bauer |
| 3,522,413 | A | 8/1970 | Chrow |
| 3,727,029 | A | 4/1973 | Chrow |
| 4,352,007 | A | 9/1982 | Baker et al. |
| 4,455,474 | A | 6/1984 | Jameson et al. |
| 4,501,974 | A | 2/1985 | Miller et al. |
| 4,510,974 | A | 4/1985 | Natori et al. |
| 4,553,023 | A | 11/1985 | Jameson et al. |
| 4,953,632 | A | 9/1990 | Sakaya et al. |
| 5,289,561 | A | 2/1994 | Da Costa Filho |
| 5,297,586 | A | 3/1994 | McIntosh |
| 5,832,178 | A * | 11/1998 | Schave .................... H05B 3/40 388/934 |
| 6,049,658 | A | 4/2000 | Schave et al. |
| 6,053,213 | A | 4/2000 | Jung et al. |
| 6,420,041 | B1 | 7/2002 | Amon et al. |
| 6,641,304 | B1 | 11/2003 | Ang et al. |
| 6,738,566 | B2 * | 5/2004 | Pagnella .................... H05B 3/58 219/534 |
| 6,761,188 | B1 | 7/2004 | Besche et al. |
| 6,844,077 | B2 * | 1/2005 | Squier ..................... B32B 27/32 156/244.11 |
| 7,266,293 | B1 | 9/2007 | Dundas |
| 9,192,754 | B2 | 11/2015 | Haschke |
| 9,308,547 | B2 | 4/2016 | Clark et al. |
| 2003/0049400 | A1 | 3/2003 | Smith et al. |
| 2004/0020546 | A1 | 2/2004 | Furuta |
| 2004/0200537 | A1 | 10/2004 | Rivest |
| 2005/0008353 | A1 | 1/2005 | Lafitte |
| 2006/0093769 | A1 * | 5/2006 | Biebuyck .................. B32B 1/08 428/36.91 |
| 2007/0082159 | A1 | 4/2007 | Mathieu et al. |
| 2009/0285983 | A1 | 11/2009 | Baldauf et al. |
| 2010/0021665 | A1 * | 1/2010 | Jackson ................ B32B 27/308 138/137 |
| 2010/0269917 | A1 * | 10/2010 | Schild ..................... B32B 27/36 137/341 |
| 2010/0300571 | A1 | 12/2010 | Miller et al. |
| 2014/0110004 | A1 | 4/2014 | Westmeier et al. |
| 2014/0144933 | A1 | 5/2014 | Estelle et al. |
| 2015/0226362 | A1 | 8/2015 | Brudevold et al. |

FOREIGN PATENT DOCUMENTS

| | | |
|---|---|---|
| CN | 103115204 A | 5/2013 |
| CN | 103608170 A | 2/2014 |
| DE | 2624267 A1 | 12/1976 |
| DE | 3307120 A1 | 9/1984 |
| DE | 202006017808 U1 | 2/2007 |
| EP | 0080811 A1 | 6/1983 |
| EP | 0084088 A1 | 7/1983 |
| EP | 0131989 A2 | 1/1985 |
| EP | 0251856 A1 | 1/1988 |
| EP | 0793045 A1 | 9/1997 |
| EP | 1113208 A2 | 7/2001 |
| EP | 1162397 A2 | 12/2001 |
| EP | 1197699 A2 | 4/2002 |
| EP | 1287981 A2 | 3/2003 |
| EP | 1304519 A2 | 4/2003 |
| EP | 0895013 B1 | 8/2003 |
| EP | 1510326 A1 | 3/2005 |
| EP | 1652664 A1 | 5/2006 |
| EP | 2054785 B1 | 3/2014 |
| FR | 1429597 A | 2/1966 |
| FR | 3006032 A | 11/2014 |
| JP | 58-099589 A | 6/1983 |
| JP | 2001-246307 A | 9/2001 |
| JP | 2014-018799 A | 2/2014 |
| JP | 2015-518553 A | 7/2015 |
| WO | 94/28694 A1 | 12/1994 |
| WO | 96/11356 A1 | 4/1996 |
| WO | 00/30846 A1 | 6/2000 |
| WO | 01/23794 A1 | 4/2001 |
| WO | 2003/022614 A2 | 3/2003 |
| WO | 2004/001271 A1 | 12/2003 |
| WO | 2006/121727 A2 | 11/2006 |
| WO | 2007/059930 A1 | 5/2007 |
| WO | 2008/013829 A2 | 1/2008 |
| WO | 2008/022708 A1 | 2/2008 |
| WO | 2008/033622 A2 | 3/2008 |
| WO | 2009/061566 A1 | 5/2009 |
| WO | 2011/146813 A2 | 11/2011 |
| WO | 2015/123376 A1 | 8/2015 |

OTHER PUBLICATIONS

European search report dated Mar. 13, 2018 for EP Application No. 17181351.

"Heated Sample Lines"; Neptech Inc.; Manufacturer of Flexotherm; 2014; 4 pages.

Observations by third parties Mailed on Apr. 14, 2021 for EP Application No. 17181351.

(56) References Cited

OTHER PUBLICATIONS

"Heating Hoses"; Teat—The Heating Hoses Company; Catalog; © 2013; 25 pages.
"UNITHERM™ Heated Hose Products"; Dekoron/Unitherm; Engineering Design Guide; © 2003; 2 pages.
https://web.archive.org/web/20010124022400/http://www.unithermcc.com/; DEKORON®/UNITHERM™; Jan. 2001; accessed Aug. 3, 2022; 2 pages.
Notice of opposition Mailed on Aug. 2, 2022 for EP Application No. 17181351.
Pizzi et al.; "Handbook of Adhesive Technology"; Second Edition, Revised and Expanded; Marcel Dekker, Inc.; © 2003; 999 pages.
"Electrical Heated—Series 500 Stainless Steel Hoses"; Spec and Description; Technical Heaters, Inc./ThermoLab; 1968; 4 pages.
"Heated Hoses—Flexible hose systems for heating media in production processes"; ISOPAD; Tyco Flow Control; 2001; 20 pages.
"Heated Hoses for Glueing Technology and for Filling and Dosing Systems"; Catalog; Winkler GmbH; © 2010-03; 24 pages.
"TEAT—Heating Hoses"; Roberto Rabai; Angst + Pfister S.p.A .; TEAT © 2013; 5 pages.
"Technical03 data: gas permeability of tube material" Jun. 15, 2016; accessed Mar. 2, 2018; 0160615053955/http://www.junkosha.co.jp/technical/tec8.html; Junkosha Inc.; 3 pages.
Affidavit Mr. Giorgio Dall'Olio of PMS Technology Srl, Aug. 9, 2022, pp. 3.
Notice of opposition—Focke Meler Gluing Solutions, S.A. Mailed on Aug. 15, 2022 for EP Application No. 17181351.2.
Notice of opposition Mailed on Aug. 26, 2022 for EP Application No. 17181351.
Vulcanic Catalog and Products; http://www.vulcanic.com; 155 pages.
Vulcanic; Heating Hoses—Type 26177; http://www.vulcanic.com; p. 68-69.
European search report dated Jul. 5, 2022 for EP Application No. 21208252.
Opposition No. 2023-700750 by Focke Meler Gluing Solutions, S.A.; dated Jul. 19, 2023 for Japan Patent Application No. 2017-138715; 139 pages (contains English translation).
Mexican Application No. MX/a/2023/001907; Notice of Opposition; dated Jun. 6, 2023; 157 pages; contains English Translation.
Notice of Opposition—Focke Meler Gluing Solutions, S.A. dated Apr. 11, 2023 for BR Application No. 102017015314-2; 44 pages (and English Machine Translation).
Notice of Opposition—Focke Meler Gluing Solutions, S.A. dated Apr. 4, 2023 for India Application No. 201714025077; 99 pages.

\* cited by examiner ial Patent App. No. 62/363,138, filed Jul. 15, 2016, the disclo-

ADHESIVE TRANSFER HOSE HAVING A BARRIER LAYER AND METHOD OF USE

CROSS REFERENCE TO RELATED APPLICATIONS

This application claims the benefit of U.S. Provisional Patent App. No. 62/363,138, filed Jul. 15, 2016, the disclosure of which is hereby incorporated by reference herein.

TECHNICAL FIELD

The present disclosure is generally directed to adhesive transfer hoses, and more specifically, to adhesive transfer hoses having a barrier layer preventing or minimizing the ingress of air into a conduit of the hose.

BACKGROUND

Hot melt adhesives, which include conventional hot melt adhesives and reactive, moisture curing hot melt polyurethane adhesives ("hot melt PURs"), are routinely used in various applications where a stable surface-to-surface bond must be formed. Further, hot melt adhesives are used in securing a variety of both similar and dissimilar materials together in a mating relationship, such as wood, plastics, corrugated films, paper, carton stocks, metals, rigid polyvinylchlorides (PVCs), fabrics, leathers, and others. These adhesives are especially useful in applications where it is desirable to have the adhesive solidify rapidly after being melted and dispensed.

In conventional hot melt adhesives, typically a polymer, a tackifier, and a selection of other additives such as antioxidants, are mixed together to produce the adhesive. These materials tend to form bonds through their rapid solidification as they cool from a melted state and have the advantage of being relatively easy to apply. In hot melt PURs, an isocyanate terminated urethane polymer is produced through the polymerization of polyols and excess polyisocyanate compounds. Hot melt PURs cure (e.g., cross-link) in the presence of adventitious moisture.

Typically, a solid form of the hot melt adhesive comes in various shapes and sizes and is supplied to a melter that includes a heated tank and/or a heated grid to produce molten hot melt adhesive. Solid hot melt adhesive can also be supplied in drums or barrels in which the adhesive is melted by the use of a platen. After heating, the molten adhesive is pumped through a heated hose that maintains the molten material at the required application temperature, to an applicator or dispenser, which is sometimes referred to as a dispensing "gun" or a gun module, comprising a valve and a nozzle. An exemplary heated hose is described in commonly owned U.S. Pat. No. 6,738,566, which is incorporated herein by reference in its entirety.

However, a common problem with heated hoses is the resulting discoloration of the molten hot melt adhesive. Such discoloration may negatively affect the "pot life" of the hot melt adhesive, since the discoloration can indicate that the hot melt adhesive has degraded. "Pot life" as used herein is the maximum time at the system temperature before the adhesive starts to degrade, thus resulting in increased viscosity, charring and/or gelling. This could be especially problematic in systems requiring relatively low flow rates. In some applications, the "pot life" of the molten adhesive can shorten if it stays within a heated hose for too long. Shortening the "pot life" of a thermoplastic adhesive may result in operational problems, such as filter clogging, and may further require cleaning of the hose after charring has occurred.

Char is adhesive that has been blackened or burned, and can result from a variety of reasons, such as heating hot melt adhesive for too long and/or heating it at too-high of a temperature. Additionally, it has been observed that the introduction of oxygen into the hose is a main cause of charring of the hot melt adhesive. Although hot melt adhesives can be protected by certain additives, like antioxidants, hot melt adhesives should not be kept in the molten state for an extended period of time since they can break down. Thus, the effects of heat, time and oxidation begin to break down the adhesive. For instance, the adhesive's polymer chains form active sites that can combine to form gels which stick to the walls of hoses and crevices in melt tanks, forming an anchor that inhibits effective flow of the hot melt adhesive through the system. Moreover, char can harden and break off into pieces that clog filters and spray nozzles.

A major problem with char is that once it gets into a hot melt system, it is very difficult and sometimes impossible to flush out. Once char forms it can cause ongoing product quality problems, extensive maintenance issues and work stoppages. In some cases, the entire hot melt system may need to be taken apart and the components must be burned out in a burnout oven to completely remove the char. This process is very time-consuming and expensive. Therefore, it is desirable to prevent or reduce char formation before it can become a problem in the system.

The inventors of the present disclosure have found that one way to prevent charring of the adhesive is by eliminating or minimizing ingress of oxygen within the hose. However, preventing or reducing the introduction of oxygen into conventional adhesive transfer hoses can pose substantial problems since typical hoses that are long and have a small diameter provide a large transfer area for a small amount of adhesive. Thus, the ingress of oxygen into the transfer hose is more likely than the ingress of oxygen into the adhesive melting tank. For example, the adhesive can sit in a heated hose for a long duration of time and experience minimal discoloration as long as oxygen is prevented from entering the hose during transfer of the adhesive.

Moreover, conventional hot melt hoses do not take into account the impact of the partial pressure of oxygen on diffusion through a typical hose core. The antioxidant and degradation processes consume oxygen within the hose, creating a driving force for diffusion from the atmosphere, despite the fact that the hose may be hydraulically pressurized to several hundred psi. Moreover, hoses that are used for high temperature applications of 500° F. and above, such as for polymer processing, are well beyond those required to sufficiently melt the solid form of adhesive to a molten flowable state.

Thus, discoloration and associated degradation of the hot melt adhesive are the result of adventitious oxygen that penetrates into and/or through the layers of the hot melt adhesive transfer hose and reacts with the hot melt adhesive under the molten temperature conditions. Accordingly, there is a need for a hot melt adhesive transfer hose having an impermeable barrier layer which serves to prevent or minimize the ingress of oxygen into the conduit of the hose that transfers the molten hot melt adhesive, thereby eliminating or at least greatly reducing the discoloration and corresponding charring of the molten hot melt adhesive during its residence time in the heated hose.

SUMMARY

A multi-layered hot melt adhesive transfer hose is provided. The transfer hose comprises a conduit for transporting heated liquid hot melt adhesive, an impermeable barrier layer configured to prevent the ingress of oxygen into a conduit of the hose that transports a molten hot melt adhesive; and at least one structural layer overlaying an exterior surface of the barrier layer and configured to withstand a high fluid pressure. More particularly, the barrier layer is configured to prevent ingress of oxygen from passing through the conduit and into the hot melt adhesive. A heater may also be provided for maintaining the hot melt adhesive at a set point temperature, wherein the heater is adapted to be electrically coupled to a power source controlled to maintain the set point to about 450° F. or less for an extended period of time.

The barrier layer and the structural layer each comprise a thermally stable material. Further, the barrier layer prevents the hot melt adhesive from charring when the adhesive is heated to about 450° F. or less for an extended period of time. The barrier layer is a flexible metal tube that can include a plurality of seamless corrugations. Alternatively, the barrier layer may be a metal tape, such as aluminum tape.

The at least one structural layer can include a braided jacket, which may be stainless steel. The flexible metal tube may also be stainless steel. Further, the at least one structural layer can include two overlapping braided jackets, and an outer covering layer has a distinct multi-layered structure overlaying an exterior surface of the at least one structural layer.

The outer covering layer can include a heating wire sublayer, an insulation sublayer covering the heating wire sublayer, and a protective sublayer covering the insulation sublayer. It should be appreciated that the outer covering layer can alternatively include a heating tape sublayer.

Further, the barrier layer may be a metallic coating applied to the inner tube. It should be appreciated that the flexible metal tube may include a liner disposed within. The liner comprises a heat stable polymeric material and is configured to improve flow of the molten hot melt adhesive through the flexible metal tube. Moreover, the liner includes a smooth interior surface that facilitates fluid flow and prevents material incompatibility issues between the molten hot melt adhesive and the flexible metal tube.

The barrier layer unexpectedly prevents the hot melt adhesive from discoloring and charring when the adhesive is heated at a temperature of about or greater than 250° F. up to and including about 450° F. for an extended period of time.

Further, a method of transporting hot melt adhesive is disclosed, including the step of transporting the hot melt adhesive at a temperature at or below about 450° F. through a multi-layered transfer hose comprising a flexible metal tube forming an impermeable barrier layer configured to prevent the ingress of oxygen into a conduit of the hose. It should be appreciated that the flexible metal tube is heated to a temperature at or below about 450° F. Alternatively, the flexible metal tube can transport hot melt adhesive at a temperature at or below about 400° F. Furthermore, the flexible metal tube can transport hot melt adhesive at a temperature at or below about 350° F.

An unexpected effect of the barrier layer is that no significant discoloration and charring of the hot melt adhesive occurs when the adhesive remained inside the hose for at least twenty-four hours, at least forty-eight hours, seventy-two hours, or ninety-six hours.

In accordance with another aspect of the present disclosure, a multi-layered hot melt adhesive transfer hose is provided, wherein at least one of the layers is an oxygen barrier layer that prevents or minimizes the ingress of oxygen into a conduit of the hose that transports a molten hot melt adhesive.

In accordance with another aspect of the present disclosure, an apparatus for melting and dispensing a hot melt adhesive is provided. The apparatus comprises a chamber for receiving a solid form of the hot melt adhesive; a heating device coupled to the chamber and configured to receive the hot melt adhesive for liquefying the solid form of the hot melt adhesive; and the multi-layered hot melt adhesive transfer hose fluidly coupled to the heating device.

Further, a method is provided for dispensing hot melt adhesive, such as a packaging grade hot melt adhesive. The method includes the steps of melting hot melt adhesive; transporting the melted hot melt adhesive through a hose to a dispenser; heating the melted hot melt adhesive in the hose at a set point temperature of about 450° F. or less; preventing, with a barrier layer, the transfer of oxygen into the adhesive within the hose; and dispensing the hot melt adhesive onto a substrate.

This method for dispensing hot melt adhesive produces no significant discoloration and charring of the adhesive when it remains inside the hose for at least 24 hours. Moreover, no significant discoloration and charring of the hot melt adhesive occur when the adhesive remains inside the hose for at least 48 hours to 96 hours.

Figure 1A:
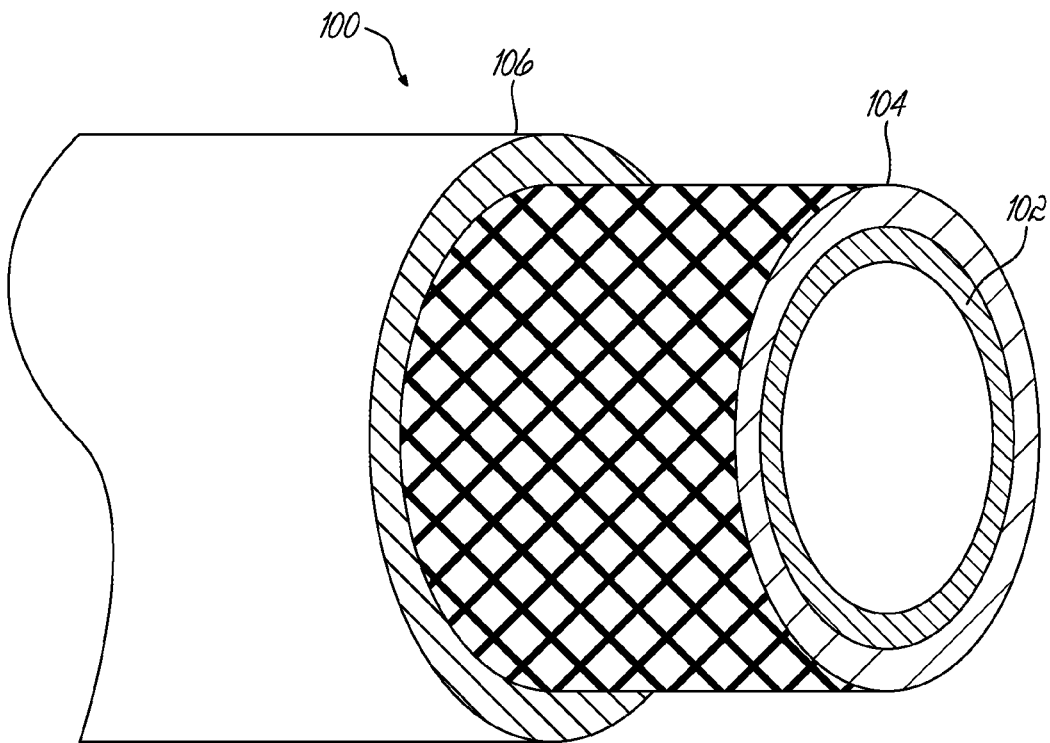
FIG. 1A is a perspective schematic view of a conventional hot melt adhesive transfer hose.

It should be noted that the figures are not necessarily drawn to scale, but instead are drawn to provide a better understanding of the components thereof, and are not intended to be limiting in scope, but rather to provide exemplary illustrations. Further, implementations of the present disclosure are described with reference to the drawings, in which like reference numerals refer to like parts throughout.

DETAILED DESCRIPTION

As noted above, discoloration of the hot melt adhesive occurring in a conventional hot melt adhesive transfer hose may negatively affect the "pot life" of the hot melt adhesive by subsequently resulting in increased viscosity, charring, or gelling. It was observed that such discoloration could be derived from adventitious oxygen that had penetrated into and/or through the layers of the hot melt adhesive transfer hose and reacted with the hot melt adhesive under the molten temperature conditions.

Thus, a multi-layered hot melt adhesive transfer hose that includes a barrier layer is disclosed. The barrier layer serves to prevent or minimize the ingress of oxygen into the conduit of the hose that transfers the molten hot melt adhesive, and thereby reduces the discoloration of the molten hot melt adhesive. Further, the inhibition or reduction in oxygen ingress may also preserve the expected "pot life" of the hot melt adhesive.

The oxygen barrier layer may be a distinct layer of the hose, or a composite or mixture of a heat stable polymer and an inorganic additive that functions as the inner tube, as will be explained in more detail below. A hot melt adhesive apparatus that incorporates one or more of the multi-layered hot melt adhesive transfer hoses, as well as a method for transferring hot melt adhesive and making the hot melt adhesive transfer hose, are also described.

In one aspect of the disclosure, the barrier layer is impermeable and thus prevents oxygen from diffusing into the conduit of the hose. In another aspect of the disclosure, the oxygen barrier layer provides a level of oxygen permeability to the hot melt adhesive transfer hose that is low enough to reduce the discoloration as compared to one void of the oxygen barrier layer. For example, the oxygen permeability of the hose with the oxygen barrier layer may be reduced by a factor of about 10 or about 100 or about 1,000 or more.

Figure 1B:
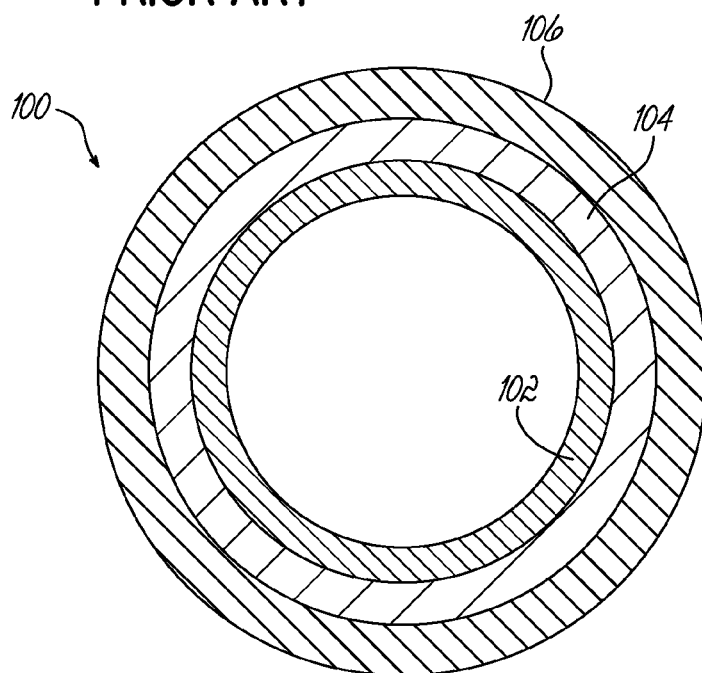
FIG. 1B is an end view of the hot melt adhesive transfer hose shown in FIG. 1A.

Referring to FIGS. 1A and 1B, a simplified multi-layered hot melt adhesive transfer hose 100 of the prior art is shown having an inner tube 102 for conveying the molten hot melt adhesive, a structural layer 104 for strength and protection, and an outer covering 106. The inner tube 102 forms the operative core of the hose 100 through which the molten hot melt adhesive actually flows.

The inner tube 102 is made from a polymeric material capable of withstanding relatively high temperatures such as polytetraflouroethylene (PTFE). Since PTFE or other similar high melting temperature polymers are typically unable to withstand the high fluid pressure used to transfer the molten hot melt adhesive, the inner tube 102 needs to be reinforced by a reinforcing layer, or structural layer 104.

The structural layer 104, which is disposed about the exterior of the inner tube 102 and serves to provide strength and protection to the inner tube 102, may comprise a braided jacket of thermally stable material. As noted above, hot melt adhesives are heated to set point temperatures sufficient to melt the solid form to a molten, flowable state, which are generally in a range from about 100° C. (about 212° F.) to about 230° C. (about 450° F.). Additionally, to facilitate flow of the molten hot melt adhesive, the hot melt adhesive transfer hose may experience pressures up to about 1500 psi (about 10.3 MPa) operating pressures. Accordingly, the structural layer 104 serves to provide desired physical integrity of the hot melt adhesive transfer hose.

Polymeric Barrier Layer

Figure 2A:
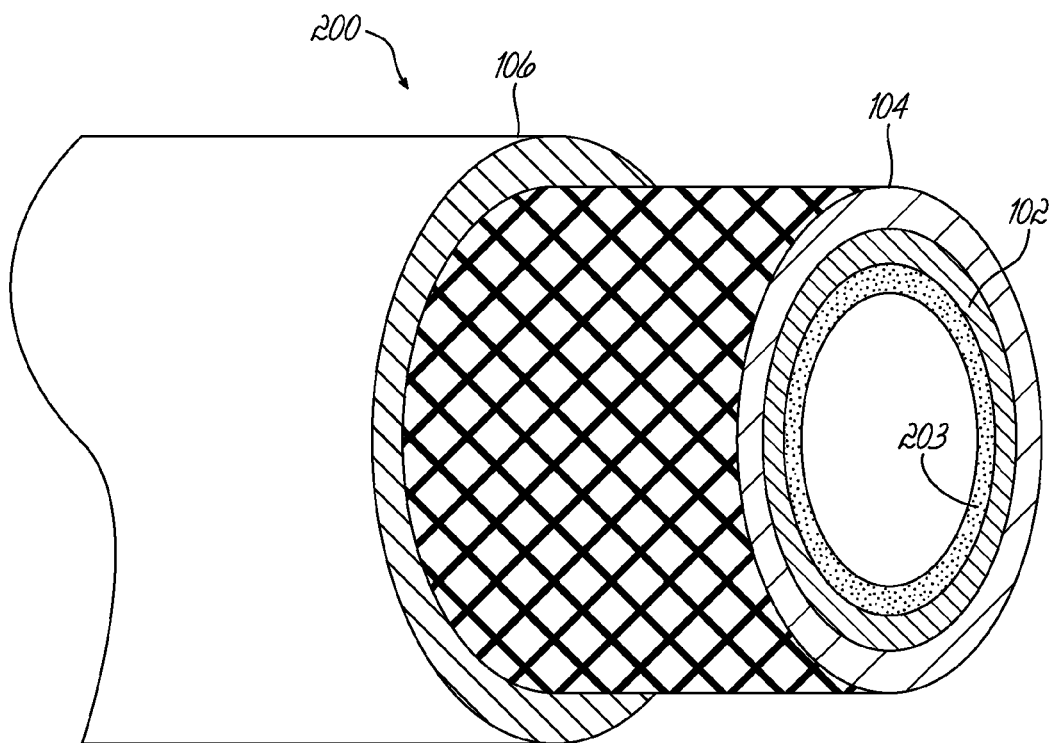
FIG. 2A is a perspective schematic view of a hot melt adhesive transfer hose, in accordance with an embodiment of the present invention.
Figure 2B:
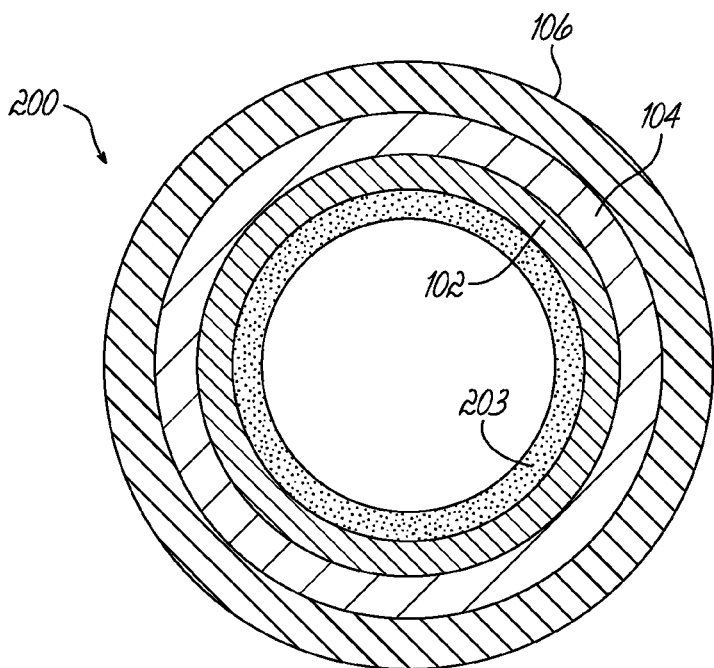
FIG. 2B is an end view of the hot melt adhesive transfer hose shown in FIG. 2A.
Figure 3A:
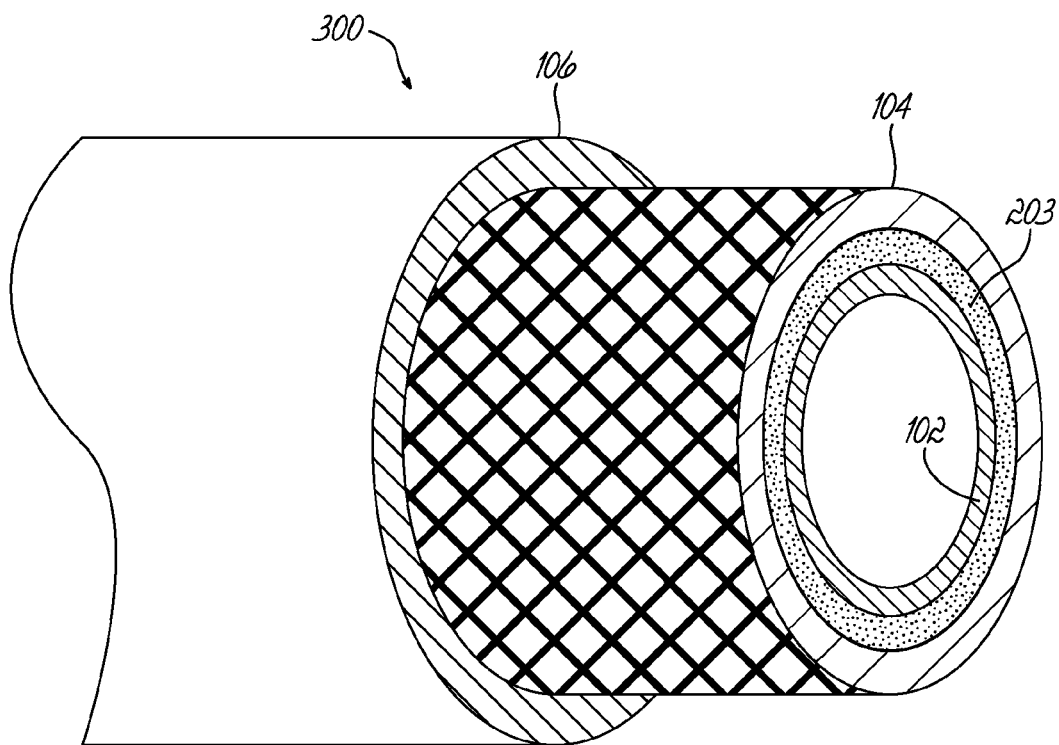
FIG. 3A is a perspective schematic view of a hot melt adhesive transfer hose, in accordance with another embodiment of the present invention.
Figure 3B:
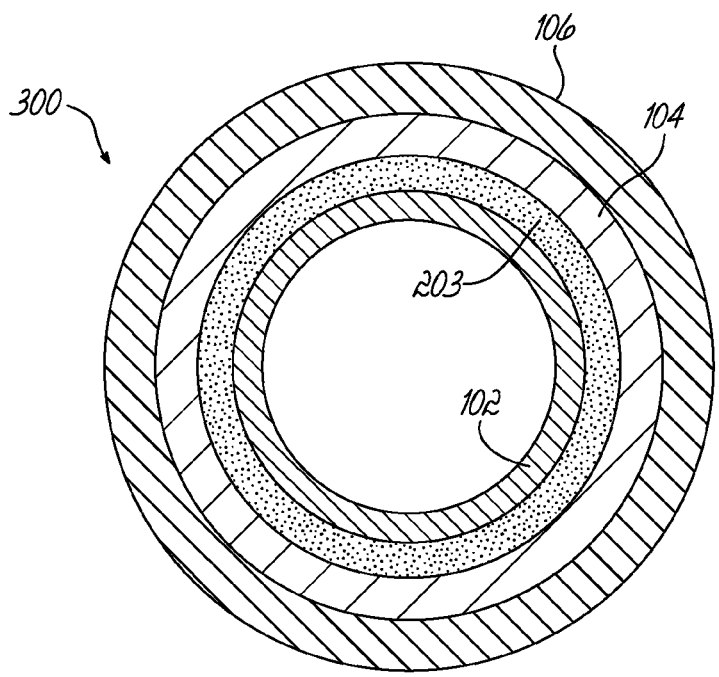
FIG. 3B is an end view of the hot melt adhesive transfer hose shown in FIG. 3A.
Figure 4A:
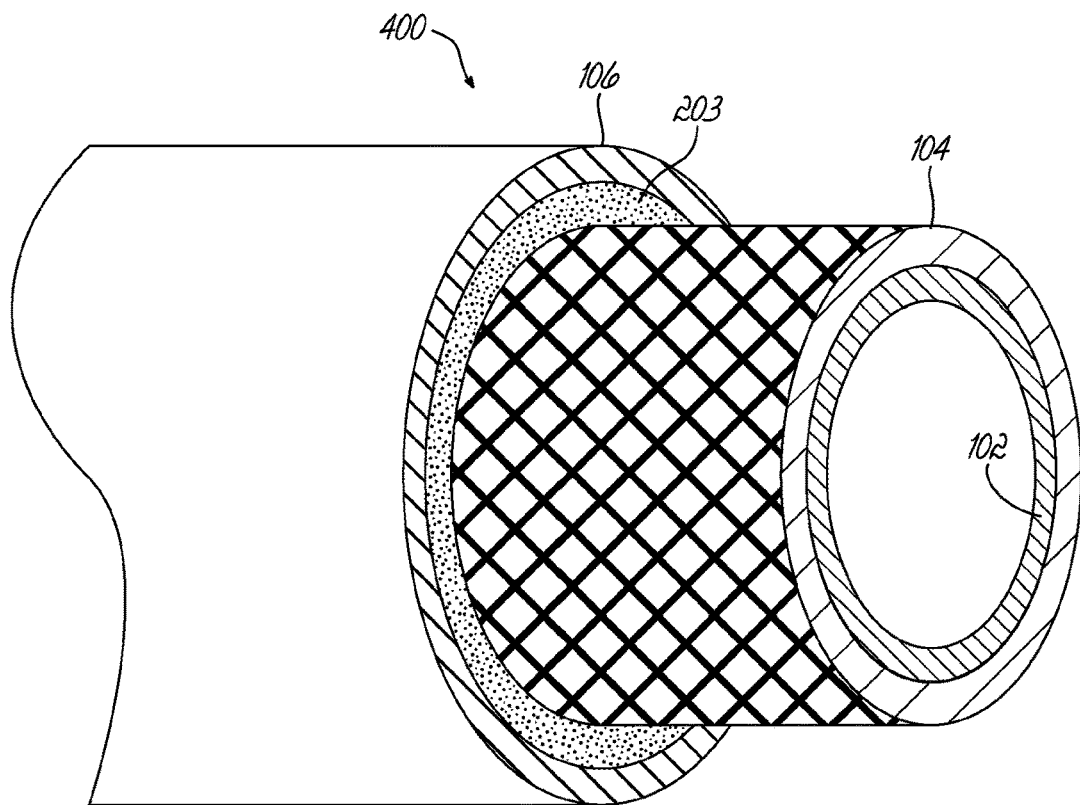
FIG. 4A is a perspective schematic view of a hot melt adhesive transfer hose, in accordance with yet another embodiment of the present invention.
Figure 4B:
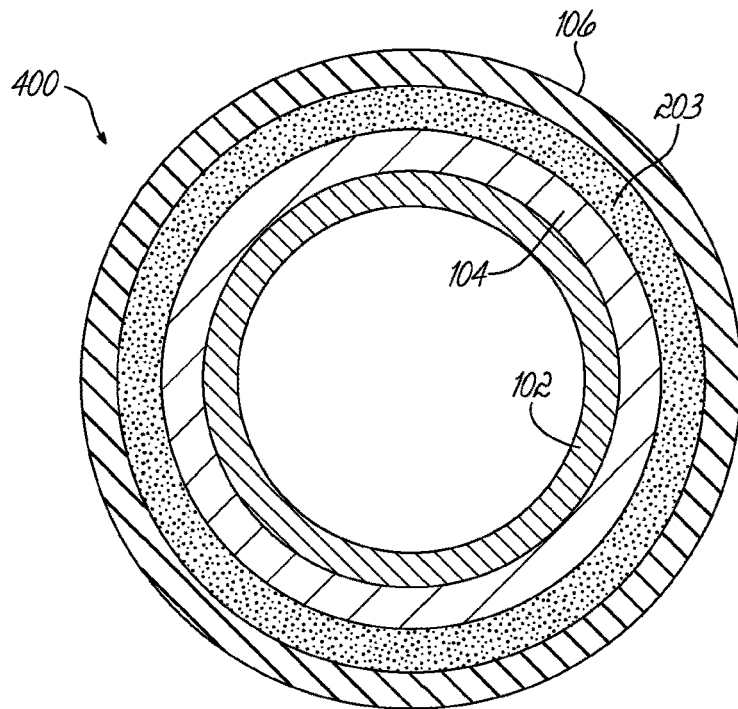
FIG. 4B is an end view of the hot melt adhesive transfer hose shown in FIG. 4A.
Figure 5A:
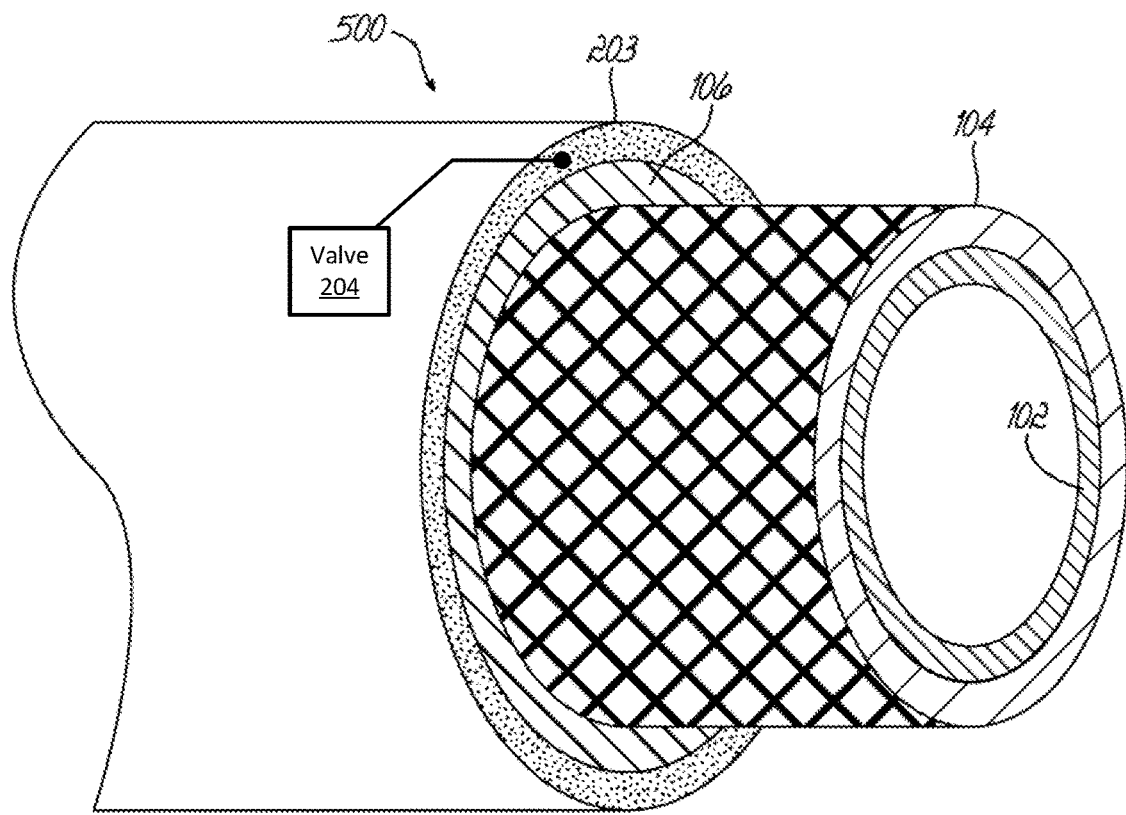
FIG. 5A is a perspective schematic view of a hot melt adhesive transfer hose, in accordance with yet another embodiment of the present invention.
Figure 5B:
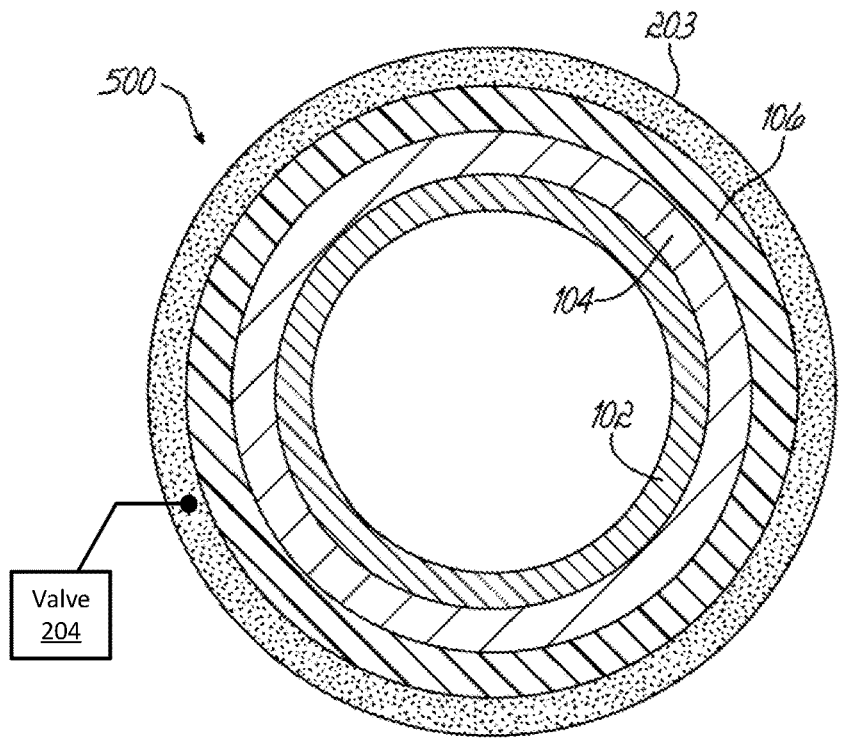
FIG. 5B is an end view of the hot melt adhesive transfer hose shown in FIG. 5A.

Thus, the present disclosure provides a multi-layered hot melt adhesive transfer hose 200 that is configured to prevent and/or reduce gasses, such as oxygen, from penetrating the hose and contacting the hot melt adhesive therein. As shown in FIGS. 2A and 2B, an oxygen barrier layer 203 of the hot melt adhesive transfer hose 200 may be a distinct layer that is in contact with an inner surface of the inner tube 102, which is in turn covered by the structural layer 104 and the outer covering 106. Alternatively, as shown in FIGS. 3A and 3B, the oxygen barrier layer 203 may be a distinct layer that is in contact with an outer surface of the inner tube 102 or an inner surface of the structural layer 104, which in turn is covered by the outer covering 106. As shown in FIGS. 4A and 4B, the oxygen barrier layer 203 may be a distinct layer that is circumferentially outside of the inner tube 102 and in contact with an outer surface of the structural layer 104 or an inner surface of the outer covering 106. As shown in FIGS. 5A and 5B, the oxygen barrier layer 203 may encompass the inner tube 102, the structural layer 104, and the outer covering 106, and is formed as a distinct layer that is in contact with an outer surface of the outer covering 106.

Referring to FIGS. 2-5, the inner tube 102 forms the operative core of the hose 200 through which the molten hot melt adhesive actually flows. The oxygen barrier layer 203 may include a polymeric material, a metallic material, or a combination thereof. The selection of the material may be dependent upon the location of the oxygen barrier layer in the hot melt adhesive transfer hose. For example, the inner tube 102, the structural layer 104, and/or the heat tape sublayer are in what may be referred to as a "hot zone," which is near or above the temperature of the molten hot melt adhesive. Alternatively, the outer surface of an insulation or the protective sublayers of the outer layer 106 are radially disposed from and are outside the hot zone, and thus are at a lower temperature. Accordingly, materials having melting temperatures above the desired working temperature of the molten hot melt adhesive may be used in constructing the oxygen barrier layer within or outside of the hot zone.

When the oxygen barrier layer 203 is within the hot zone, the melting point of the material constructing the oxygen barrier layer 203 should have a melting point sufficiently above the desired working temperature of the molten hot melt adhesive. For instance, the melting point of the material constructing the oxygen barrier layer 203 within the hot zone is preferably above the desired working temperature of the molten hot melt adhesive by at least about 50° F. or more, or about 100° F. or more, or 200° F. or more. Examples of such materials having a sufficiently high melting point include, but are not limited to, metallic materials such as metal foils or metal coatings. Non-limiting examples of the metallic materials include an aluminum foil backed tape, or a metal or metallic coating applied by sputtering, chemical vapor deposition (CVD), plasma-enhanced chemical vapor deposition (PECVD), or atomic layer deposition (ALD). The surface of the layer onto which the metal or metallic coating is applied may be modified to improve metal adhesion, such as that described in U.S. Pat. No. 6,420,041, which is incorporated by reference herein in its entirety. The thicknesses of the metal materials useful for forming the oxygen barrier layer may vary depending on the desired level of reduction in oxygen permeability.

With respect to the oxygen barrier layer 203 comprising polymeric materials, either alone or in combination with metallic materials, the melting point of the polymeric materials may render the placement of the oxygen barrier layer 203 according to the placement depicted in one of FIGS. 2-5 more preferable over another. A list of exemplary polymeric materials having desirable oxygen permeability values is shown in Table 1:

TABLE 1

Gas Permeability of Select Polymers

| Polymer | Abbreviation, Product Name, etc. | Oxygen permeability (cc/cm$^2$/mm/sec/ cmHg × 10$^{10}$) |
|---|---|---|
| Polytetrafluoroethylene | PTFE, Teflon ™ | — |
| Perfluoro ethylene-propylene copolymer | FEP | 59 |
| Polyvinylidene chloride | PVDC, Saran ™ | 0.05 |
| Polyvinyl Fluoride | PVF, Tedlar ® | 0.2 |
| Polyethylene terephthalate | PET | 0.3 |
| Polychlorotrifluoroethylene | PCTFE | 0.25-5.4 |
| Phenol resin | PF, Bakelite ® | — |
| Polyamide | PA, Nylon | 0.38 |
| Epoxy resin | EP | 0.49-16 |
| Polystyrene methacrylonitrile | PS-MAN | 1.6 |
| Polyacetal (homopolymer) | POM | 0.38 |
| Polyvinyl chloride | PCV | 1.2-6 |

TABLE 1-continued

Gas Permeability of Select Polymers

| Polymer | Abbreviation, Product Name, etc. | Oxygen permeability (cc/cm$^2$/mm/sec/ cmHg × 10$^{10}$) |
|---|---|---|
| Styrene-acrylonitrile | — | 3.4 |
| Cellulose acetate | CA | 4.0-7.8 |

*** Table obtained from http://junkosha.co.jp/technical/tec8.html, which was adapted from Teflon ® Handbook of Dupont-Mistubushi Fluorochemicals Co. Ltd.

In addition, the polymeric material may comprise a urethane, such as a thermoplastic polyether-urethane (TPEU) or thermoplastic polyester-polyurethane elastomer, as disclosed in U.S. Pat. No. 9,192,754.

To further reduce the oxygen permeability of the polymeric material, the polymeric material may also be combined with an inorganic additive, such as clays, silicates and silicas, pillared materials, metal salts, nanoplatelets, or mixtures thereof, such as those described in U.S. Patent Application Publication No. 2010/0300571, which is incorporated herein by reference in its entirety. For example, to reduce the permeability of the polymeric material-based oxygen barrier layer, it is possible to add lamellar nanofillers to the polymeric material matrix. Such a reduction in permeability may be attributed to an effect of "tortuousness" brought about by the lamellar nanofillers. This is because the oxygen has to follow a much longer pathway because of these obstacles arranged in successive strata. Theoretical models regard the barrier effects as becoming more pronounced as the aspect ratio, that is to say the length/thickness ratio, increases.

The lamellar nanofillers which are most widely investigated today are clays of smectite type, mainly montmorillonite. The difficulty of use lies first of all in the more or less extensive separation of these individual lamellae, that is to say the exfoliation, and in their distribution, in the polymer. To help in the exfoliation, use may be made of an "intercalation" technique, which consists in swelling the crystals with organic cations, generally quaternary ammonium cations, which will compensate for the negative charge of the lamellae. These crystalline aluminosilicates, when they are exfoliated in a thermoplastic matrix, exist in the form of individual lamellae, the aspect ratio of which may reach values of the order of 500 or more.

In accordance with another aspect of the present invention, the inorganic additive may include particles based on zirconium, titanium, cerium and/or silicon phosphate, in the form of non-exfoliated nanometric lamellar compounds, as disclosed for example in U.S. Patent Application Publication No. 2007/0082159, the relevant portions of which are hereby incorporated herein by reference.

The inorganic additive content of the polymeric material used in constructing the oxygen barrier layer 203 may vary depending on the desired level of reduction in oxygen permeability. When present, the inorganic additive may be present in the polymeric material in an amount from 0.01% to about 50% by weight with respect to the total weight of the oxygen barrier layer 203 composition.

Figure 6A:
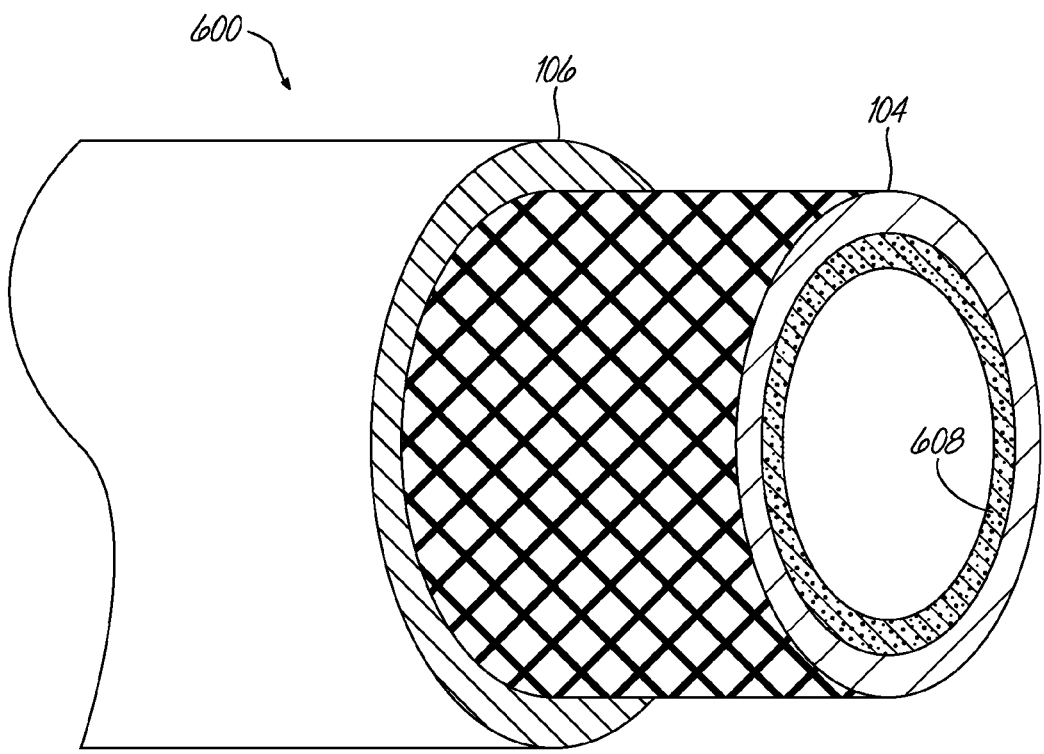
FIG. 6A is a perspective schematic view of a hot melt adhesive transfer hose, in accordance with an embodiment of the present invention.
Figure 6B:
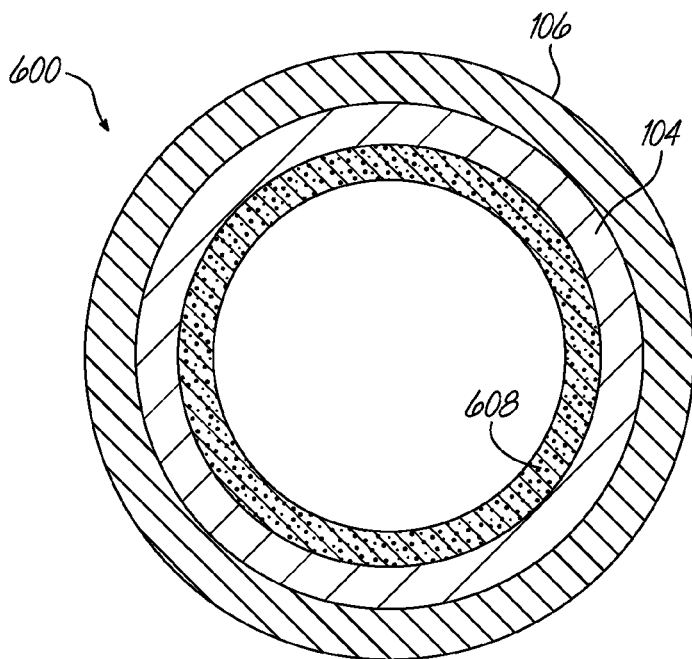
FIG. 6B is an end view of the hot melt adhesive transfer hose shown in FIG. 6A.

Turning to FIGS. 6A and 6B, a barrier inner tube 608, which includes a combination of a polymeric material and one or more of the inorganic additives described above, may be used in constructing the hot melt adhesive transfer hose 600. The inorganic additive content of the polymeric material used in constructing the barrier inner tube 608 may vary depending on the desired level of reduction in oxygen permeability. The inorganic additive may be present in the polymeric material in an amount from 0.01% to about 50% by weight with respect to the total weight of the barrier inner tube 608 composition. In one non-limiting example, the barrier inner tube 608 may comprise a fluoropolymer (e.g., polytetrafluoroethylene) in combination with a sufficient quantity of one or more of the inorganic additives described above to provide the desired level of reduction in oxygen permeability.

With respect to placement of the oxygen barrier layer 203 outside the hot zone (e.g., outside the insulation sublayer of outer layer 106, or outside the protective sublayer of outer layer 106), any airtight layer will expand and contract as the gases trapped within the insulation layers expand under the heat applied by the heating tape. To accommodate any thermal expansion, the oxygen barrier layer 203 may be oversized and/or corrugated, or fitted with a one-way valve 204 (shown in FIGS. 5A,B) to allow the expansion gases to escape and subsequently blocks the ingress of oxygen. As noted above, placement of the oxygen barrier layer 203 outside the hot zone further permits lower melting or softening materials to be used for this purpose. For example, metalized polymer films (e.g., aluminized mylar) may be used outside the hot zone, in addition to the higher melting materials discussed above.

Although not shown, it should be appreciated that the transfer hose 600 shown in FIGS. 6A and 6B may also include a distinct oxygen barrier layer 203, such as that shown in FIGS. 2-5. It should be further appreciated that while the oxygen barrier layer 203 or the barrier inner tube 608 may block or inhibit the ingress of oxygen into the conduit transporting the hot melt adhesive, it may be advantageous to utilize a low oxygen or inert gas atmosphere during the manufacture of the oxygen barrier layer 203, the barrier inner tube 608, and/or the hot melt adhesive transfer hose.

EXAMPLES

Figure 7:
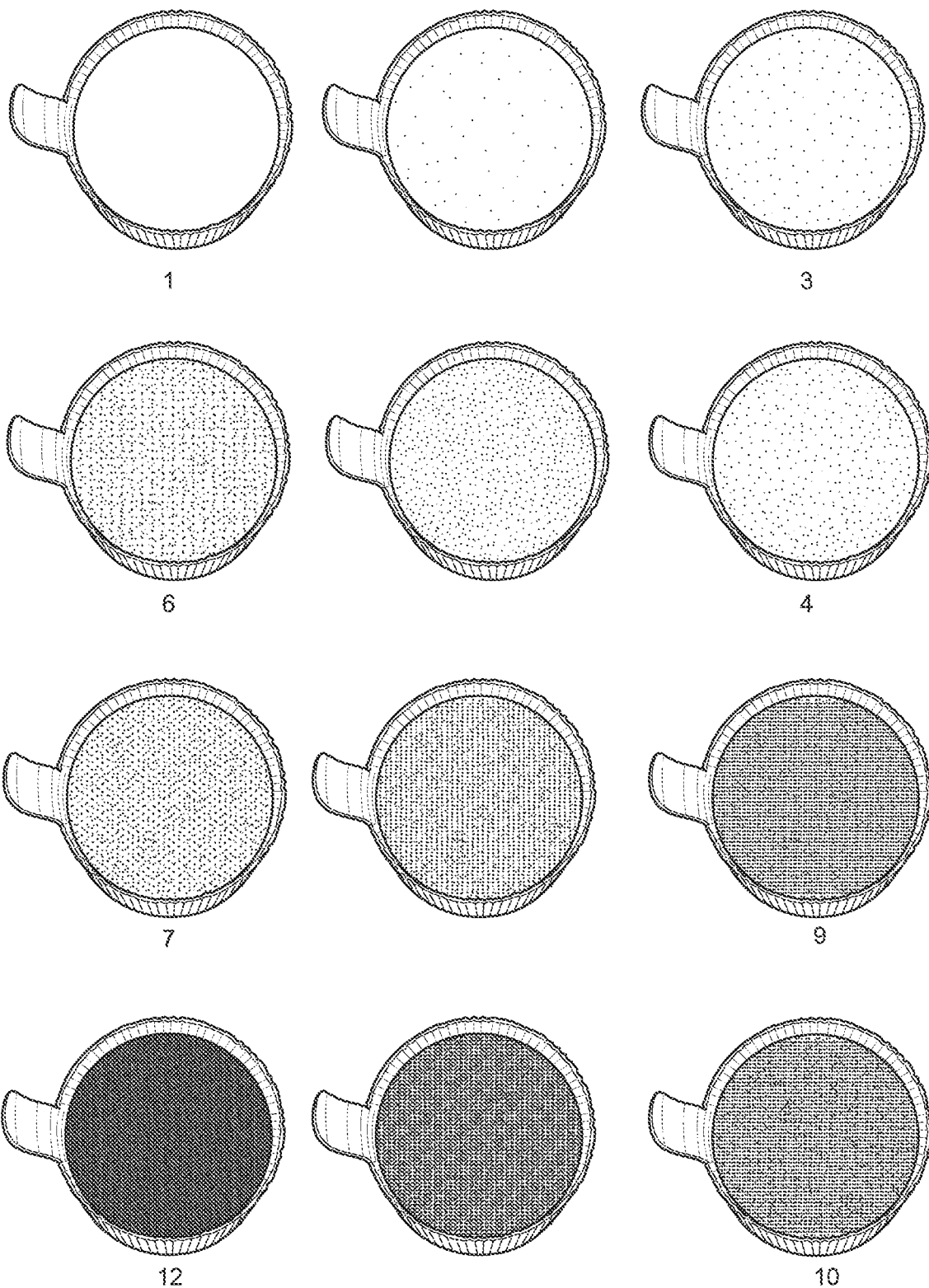
FIG. 7 illustrates pan samples of Henkel 314C hot melt adhesive that have been heated from 0 to about 95 hours at 350° F. in a laboratory oven showing various states of discoloration.
Figure 8:
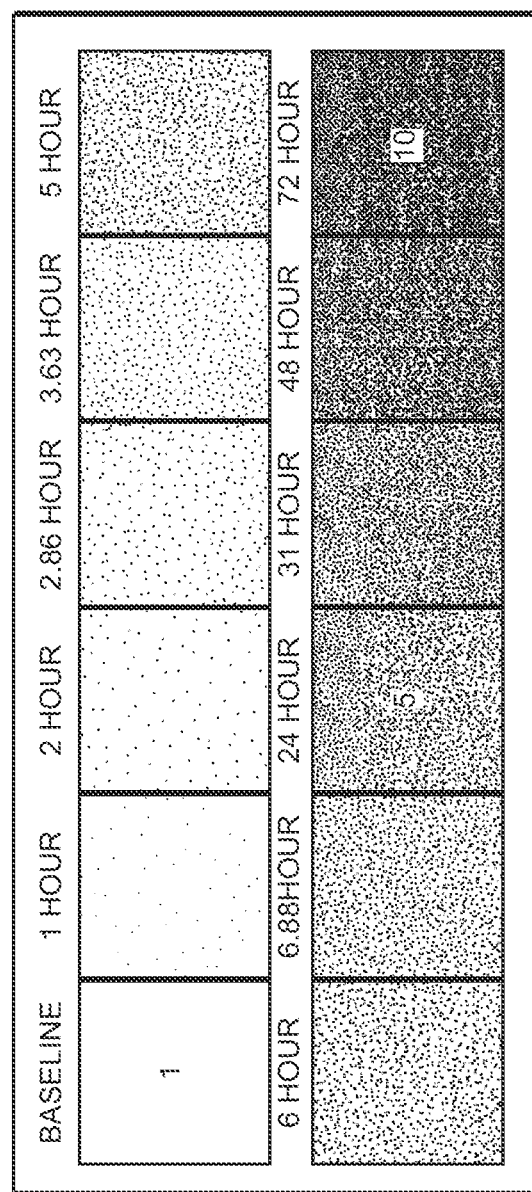
FIG. 8 shows an illustrative qualitative discoloration grading scale from 1 to 10, which is based on the samples shown in FIG. 7.

Standard: To qualitatively evaluate the observed discoloration of Henkel 614C hot melt adhesive in hot melt adhesive transfer tubing, twelve (12) samples of Henkel 614C contained in aluminum sample pans heated in a laboratory oven at 350° F. under ambient atmosphere from 0 to about 72 hours. At various intervals, a sample was removed from the oven and allowed to cool to room temperature. The degree of discoloration increases with increased residence time in the 350° F. oven (see FIG. 7). Based on the illustrations of the 12 samples, FIG. 8 illustrates a qualitative color scale ranging from a base line of 1 (for an un-heated sample of Henkel 614C) to a maximum of 12 (for a sample heated for about 95 hours).

Figure 9:
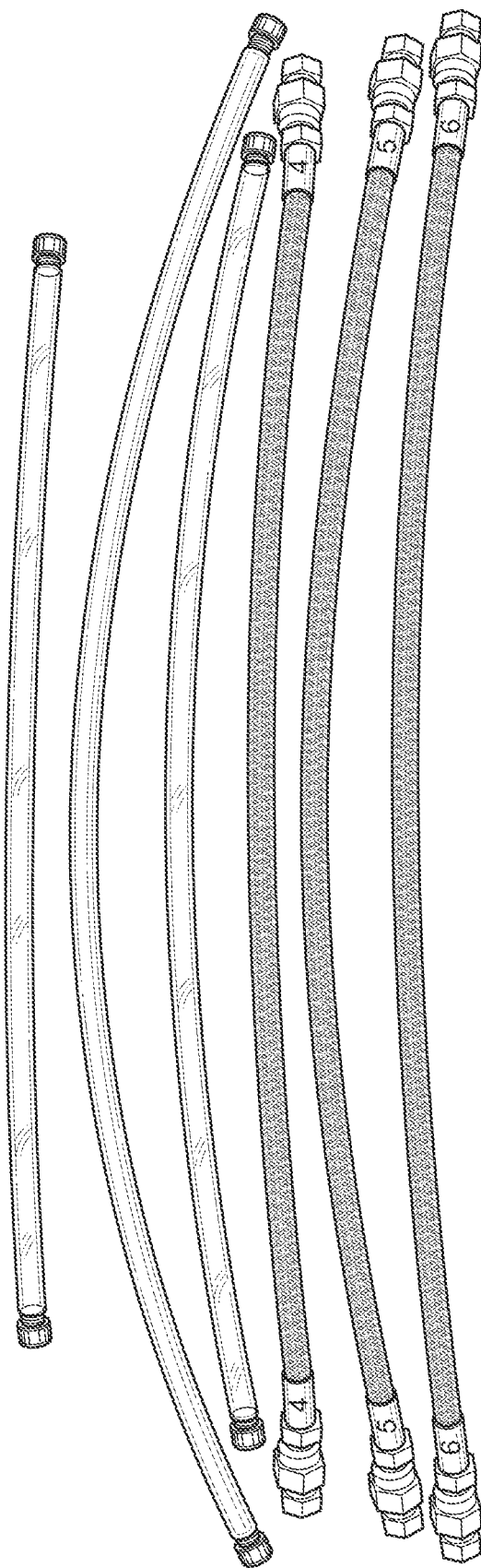
FIG. 9 illustrates various exemplary test hoses.
Figure 10:
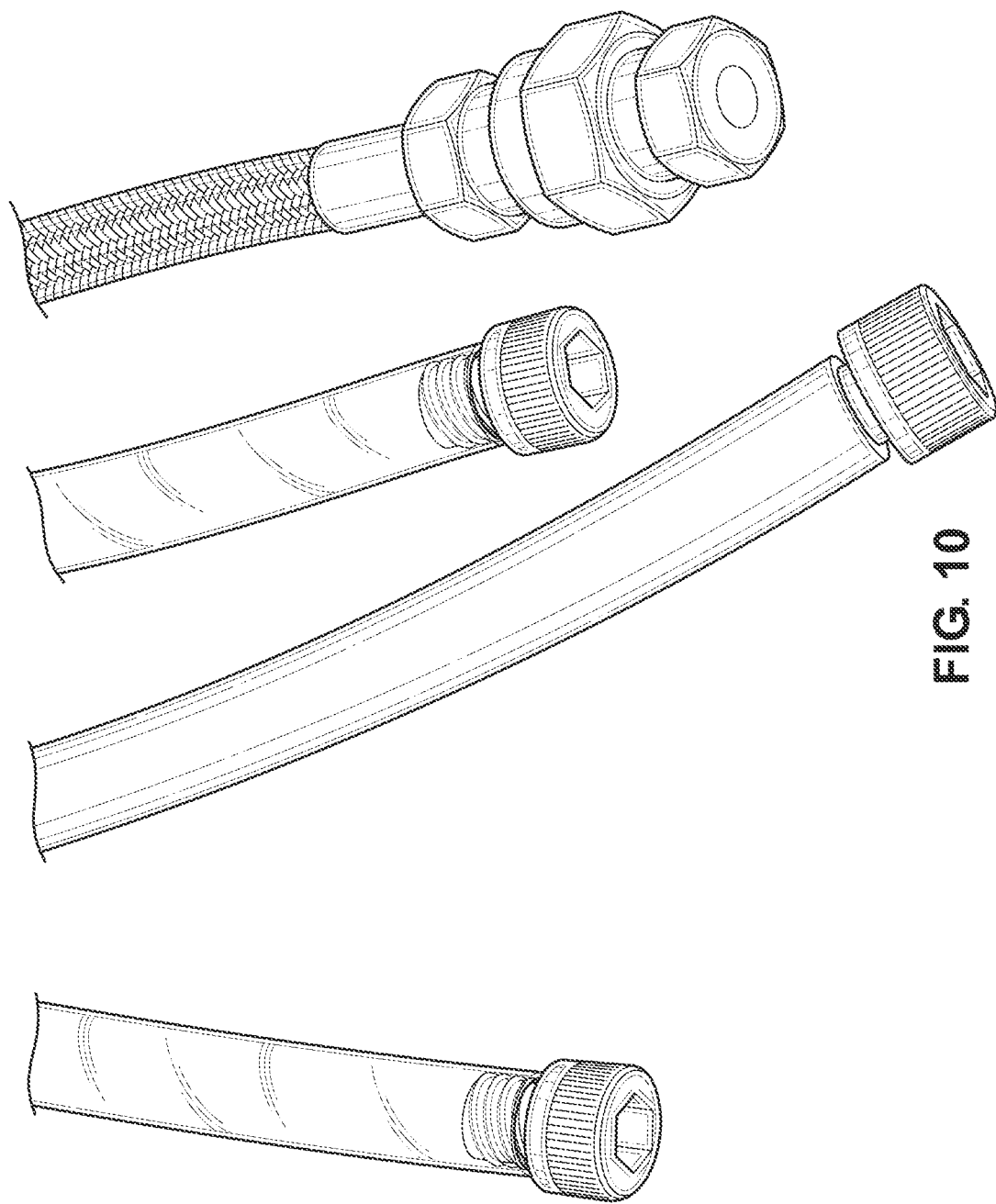
FIG. 10 illustrates the end caps of the exemplary test hoses shown in FIG. 9.
Figure 11:
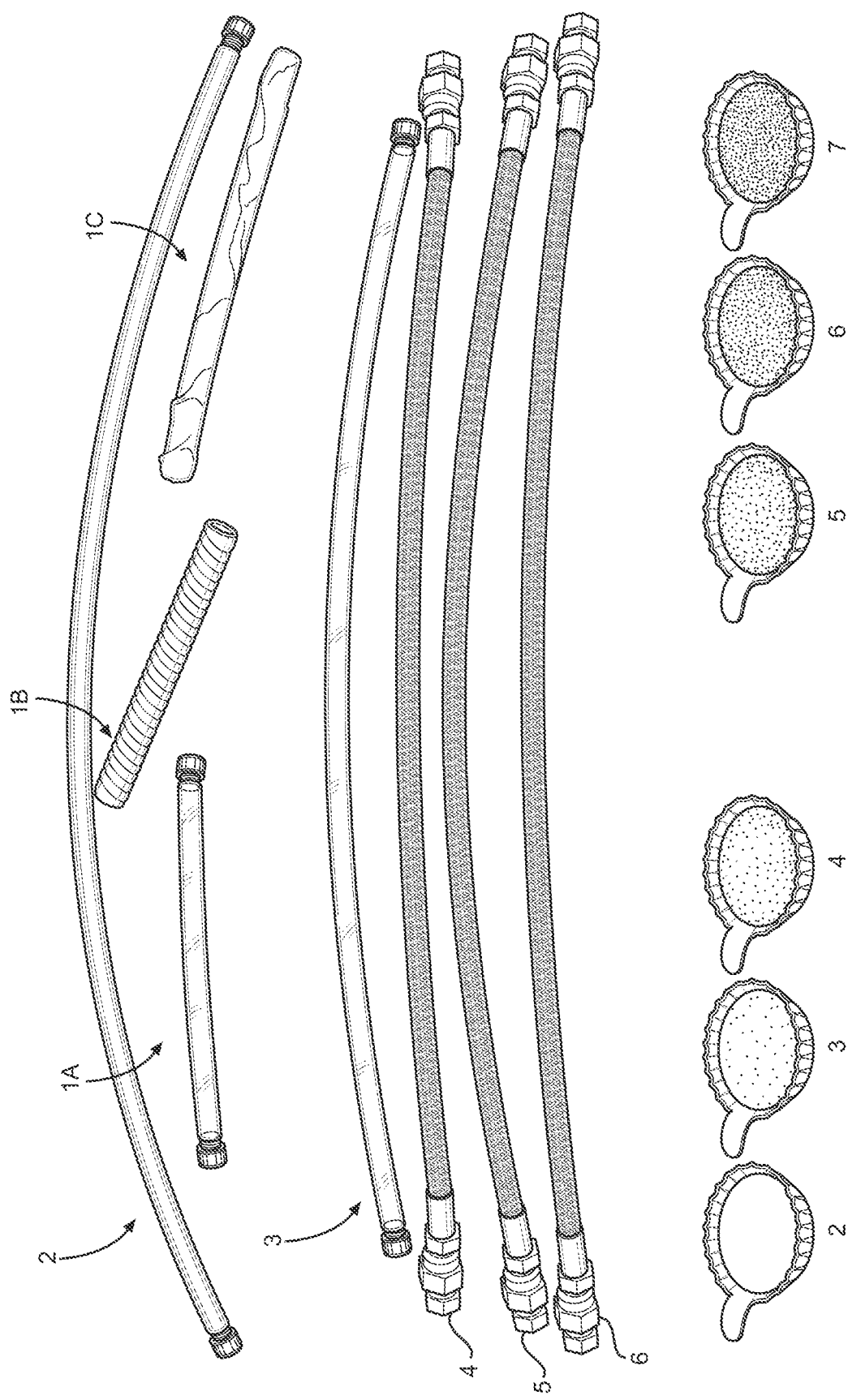
FIG. 11 illustrates placement of the testing samples reported below in Table 1 before beginning an experiment described herein.

Comparative testing: Multiple samples were evaluated using different tubing with or without any oxygen barrier layers applied. As shown in FIG. 9, different tubing types include 0.030" PTFE (Dupont Teflon® 62X resin based) core with or without stainless steel braid; 0.040" PTFE core with or without stainless steel braid; or 0.030" PTFE carbon-lined core with or without stainless steel braid. As shown in FIG. 10, the tubing samples without stainless steel braid were sealed using black plastic screw caps. Multiples tubing and aluminum pan ("ratpan") samples were prepared as described in Table 2 (below), and placed in a laboratory oven (see FIG. 11) and heated to 350° F. for 29 hours. The samples were qualitatively evaluated using the developed color scale described above.

TABLE 2

Henkel 614C test samples and results.

| # | Description | L | Misc | Test | Color Scale |
|---|---|---|---|---|---|
| 1a | 0.040" PTFE core | 8⅜" | no wrap | Put in oven at 350° F. 2/23 10:30 am; removed at 29 hrs; let cool overnight | 10/11 (light side/dark side) |
| 1b | 0.040" PTFE core w/silicone tape | 6⅜" | 2 layers of 272864, ½ overlap, wrapped in same direction | Put in oven at 350° F. 2/23 10:30 am; removed at 29 hrs; let cool overnight | 9/10 |
| 1c | 0.040" PTFE core w/foil | 7⅝" | approx 4 layers of household aluminum foil, also some aluminum tape in an attempt to seal it | Put in oven at 350° F. 2/23 10:30 am; removed at 29 hrs; let cool overnight | 6⅞-10 in middle, 3⅝ on ends |
| 2 | 0.040" PTFE core w/carbon | 2 ft | | Put in oven at 350° F. 2/23 10:30 am; removed at 29 hrs; let cool overnight | 9/10 |
| 3 | 0.030" PTFE core | 2 ft | | Put in oven at 350° F. 2/23 10:30 am; removed at 29 hrs; let cool overnight | 10/11 |
| 4 | Hose, 0.040" PTFE core w/stainless steel ("ss") braid | 2 ft | poured out 12.5 g | Put in oven at 350° F. 2/23 10:30 am; poured out at 29 hrs | 9-10 |
| 5 | Hose, 0.040" PTFE carbon-lined core w/ss braid | 2 ft | poured out 9.3 g | Put in oven at 350° F. 2/23 10:30 am; poured out at 29 hrs | 9 |

TABLE 2-continued

Henkel 614C test samples and results.

| # | Description | L | Misc | Test | Color Scale |
|---|---|---|---|---|---|
| 6 | Hose, 0.030" PTFE core w/ss braid | 2 ft | poured out 9.3 g | Put in oven at 350° F. 2/23 10:30 am; poured out at 29 hrs | 10-11 |
| 1 | Ratpan of 614C | | ≈19 g | | |
| 2 | Ratpan of 614C | | ≈4.0 g | Put in oven at 350° F. 2/23 10:30 am; removed at 24 hrs | 12 |
| 3 | Ratpan of 614C | | ≈6.9 g | Put in oven at 350° F. 2/23 10:30 am; removed at 24 hrs | 12 |
| 4 | Ratpan of 614C | | ≈13.0 g | Put in oven at 350° F. 2/23 10:30 am; removed at 24 hrs | 11 |
| 5 | Ratpan of 614C | | ≈21.1 g | Put in oven at 350° F. 2/23 10:30 am; removed at 29 hrs | 9 |
| 6 | Ratpan of 614C | | ≈25.3 g | Put in oven at 350° F. 2/23 10:30 am; removed at 29 hrs | 9 |
| 7 | Ratpan of 614C | | ≈30.0 g | Put in oven at 350° F. 2/23 10:30 am; removed at 29 hrs | 9 |

Figure 12:
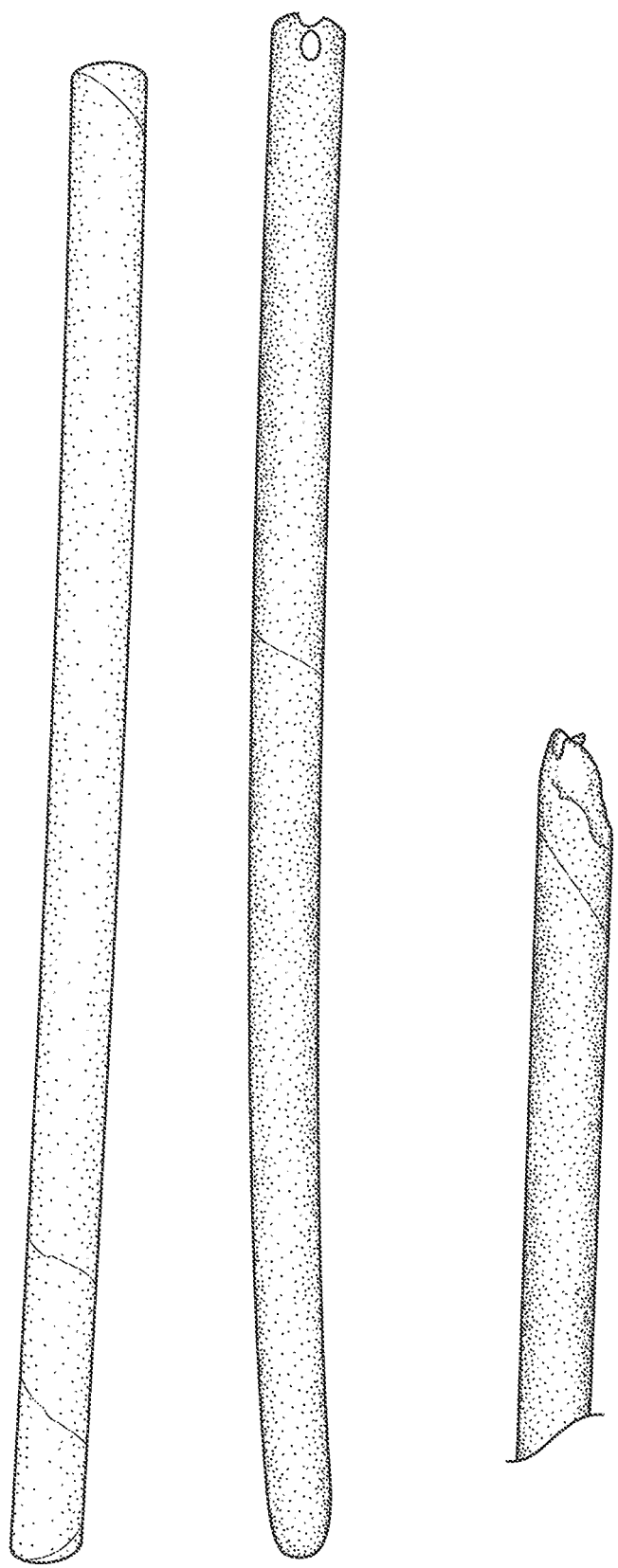
FIG. 12 illustrates samples 1b, 1a, and 1c (left to right) after the completion of the experiment described herein.

As illustrated in FIG. 12, the aluminum foil-wrapped PTFE inner tube (Sample 1c) provided an improvement in the discoloring of the molten hot melt adhesive under simulated testing conditions as compared to the uncoated PTFE tube (Sample 1a) or the silicone tape wrapped PTFE tube (Sample 1b). Although not shown, significant discoloring (e.g., 9 or higher) was still observed with the PTFE tubing that had an interior carbon coating. Further, it should be understood that in the event that color evaluation of the molten hot melt adhesive is to be monitored in-process, the equipment and methods described in commonly-assigned U.S. Patent Application Publication No. 2014/0144933, which is expressly incorporated herein by reference in its entirety, may be utilized.

Metal Barrier Layer

Figure 13A:
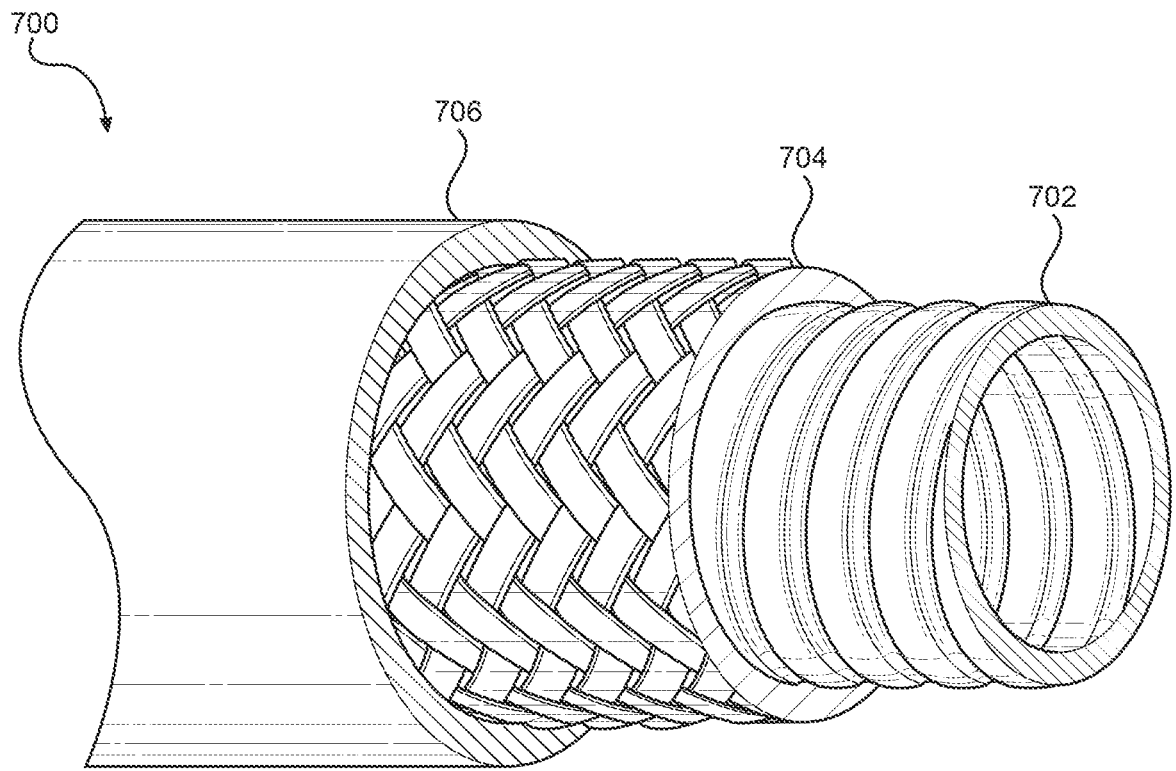
FIG. 13A is a perspective schematic view of a hot melt adhesive transfer hose in accordance with the present disclosure.
Figure 13B:
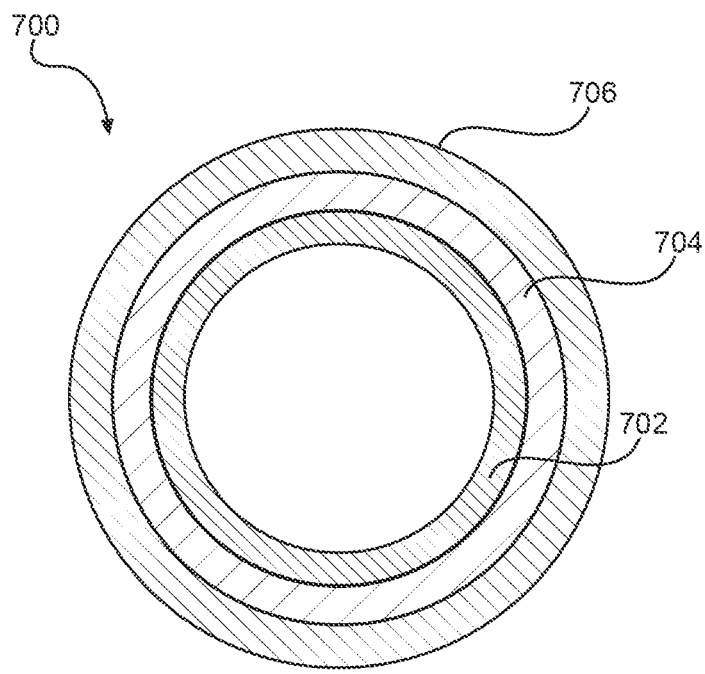
FIG. 13B is an end view of the hot melt adhesive transfer hose shown in FIG. 13A.

In accordance with another aspect of the present disclosure, there is provided a multi-layered hot melt adhesive transfer hose 700 configured to prevent air and other gasses from penetrating the hose and contacting the hot melt adhesive therein. As shown in FIGS. 13A and 13B, the hot melt adhesive transfer hose 700 includes a barrier layer comprising an inner tube 702 configured to prevent the ingress of oxygen and other gases into the conduit of the hose, thereby eliminating discoloration and any associated degradation of the molten hot melt adhesive. Further, the prevention of oxygen passing into the hose also preserves the expected "pot life" of the hot melt adhesive.

The inner tube 702 forms the operative core of the hose 700 through which the molten hot melt adhesive actually flows. The inner tube 702 is preferably made from a metallic material capable of withstanding relatively high temperatures such as stainless steel. In another aspect of the disclosure, the barrier layer can be a metal tape, such as aluminum, or a metallic coating applied to the core as will be discussed in greater detail below. Unlike an inner tube of conventional hoses, the metal inner tube 702 of the hot melt adhesive hose 700 is gas impermeable, and therefore does not allow any air to diffuse into the conduit containing the hot melt adhesive. Thus, the barrier layer comprising the metal inner tube 702 prevents oxygen and other gasses from entering the hose and coming into contact with the hot melt adhesive, thereby eliminating charring.

Additionally, the metal inner tube 702 blocks moisture from affecting hot melt PURs, and can also keep gasses within the hose from escaping. For instance, foamed hot melt within the metal inner tube 702 maintains gas in solution longer than standard hoses. Moreover, manufacturing an imperviable flexible barrier layer comprising a metal inner tube according to the present disclosure is more time and cost efficient since existing hose manufacturing processes can be utilized and/or easily modified.

The inner tube 702 has seamless corrugations to allow for flexibility, and preferably maintains a consistent tube wall thickness throughout the hose to minimize residual stress in the metal. Further, the inner tube 702 may be oversized. The inner tube 702 is reinforced by a reinforcing layer, or a structural layer 704 to help withstand the high fluid pressure used to transfer the molten hot melt adhesive. The structural layer 704, which is disposed about the exterior of the inner tube 702 and serves to provide added strength and protection to the inner tube, may comprise a braided jacket of thermally stable material.

Figure 14A:
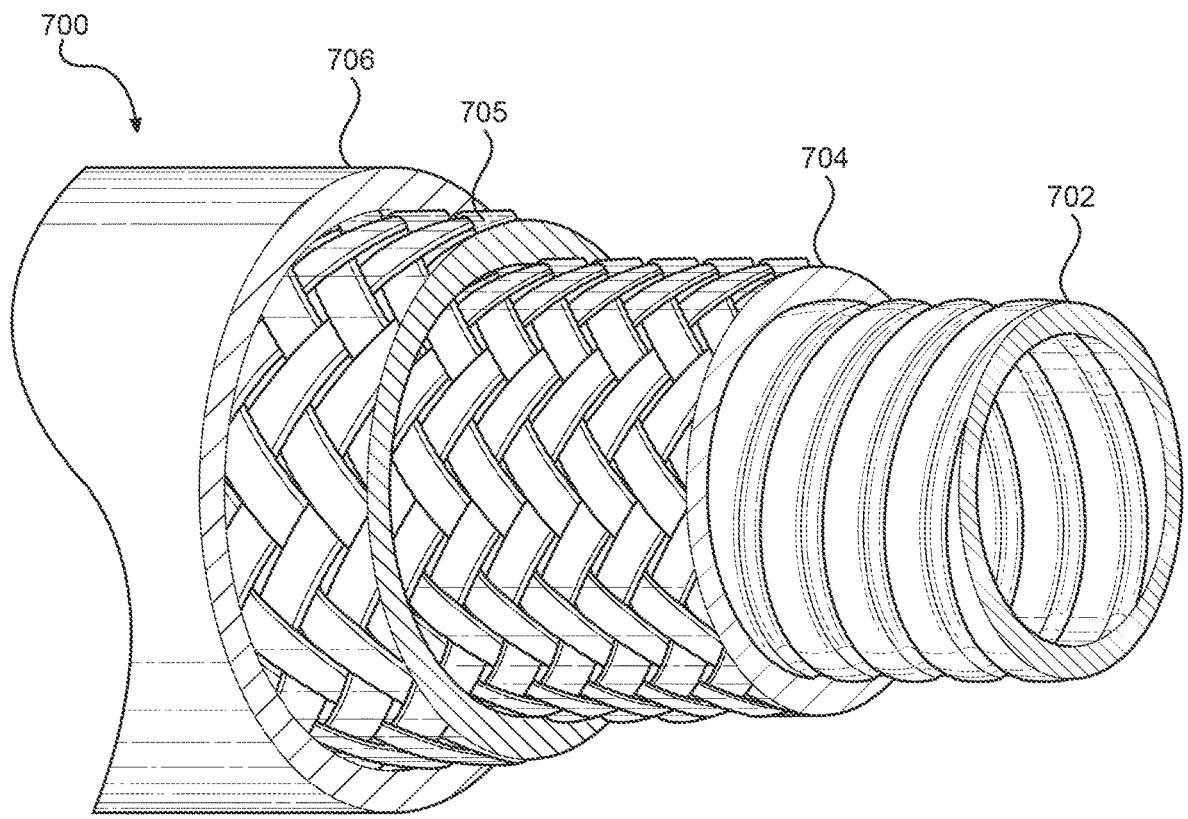
FIG. 14A is a perspective schematic view of a hot melt adhesive transfer hose in accordance with another aspect of the present disclosure.
Figure 14B:
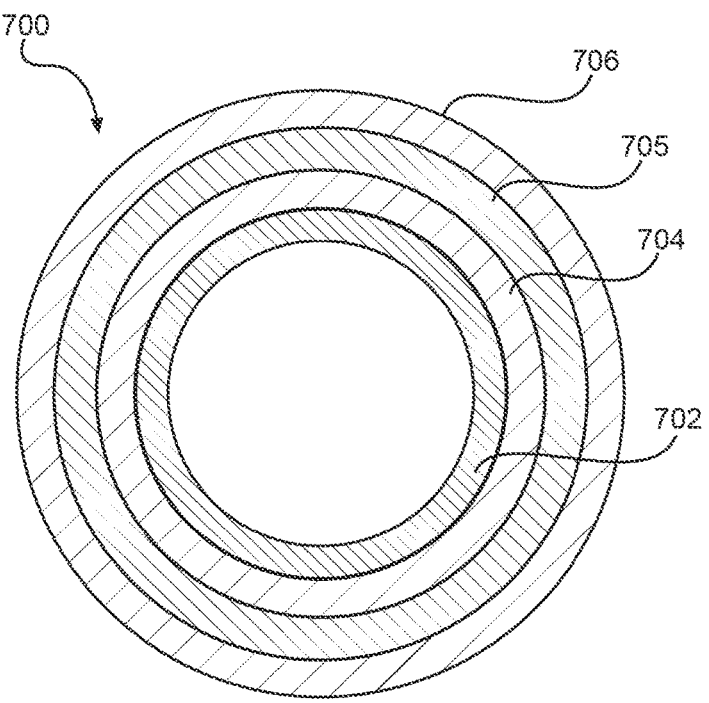
FIG. 14B is an end view of the hot melt adhesive transfer hose shown in FIG. 14A.

Accordingly, the structural layer 704 serves to provide desired physical integrity of the hot melt adhesive transfer hose. In one non-limiting example, the structural layer 704 includes a braided jacket made of stainless steel. The braiding frequency and/or thickness of the braid may vary depending on the expected temperature and pressure limits of the hot melt adhesive apparatus. The braid may be a spiral, a helical, woven/interwoven, or hoop/loop patterns such as square or single braids. Further, the hose 700 can include a plurality of structural layers 704 to provide additional reinforcement for high pressure capability. As shown in FIG. 14, a hose 700 having two overlapping structural layers 704, 705 is provided.

Figure 15A:
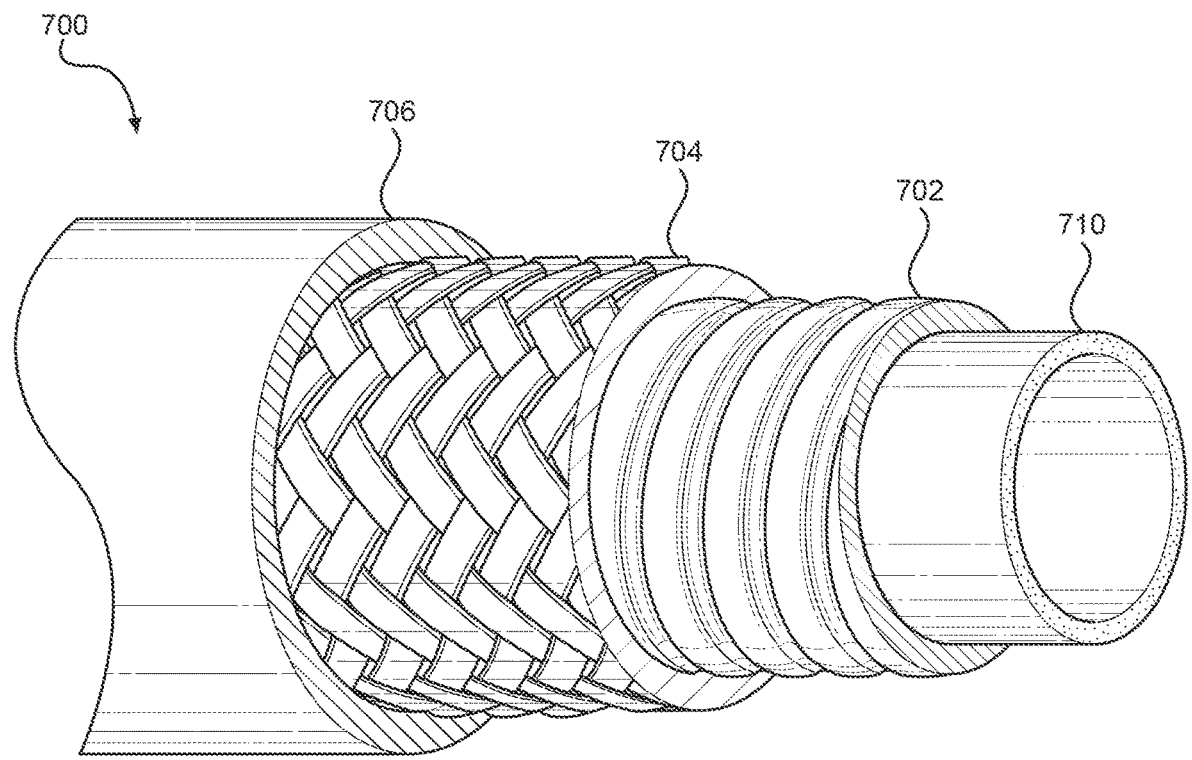
FIG. 15A is a perspective schematic view of a hot melt adhesive transfer hose in accordance with another aspect of the present disclosure.
Figure 15B:
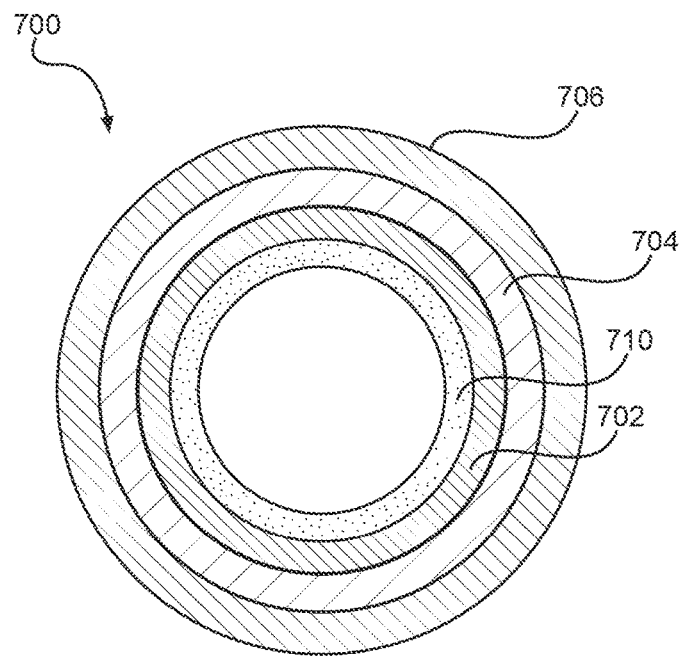
FIG. 15B is an end view of the hot melt adhesive transfer hose shown in FIG. 15A.

Additionally, the hot melt adhesive transfer hose 700 may comprise a liner 710 provided on an inner surface of the inner tube 702 as shown in FIGS. 15A and 15B. The liner 710 preferably comprises a heat stable polymeric material such as polytetrafluoroethylene (PTFE) or other polymer capable of withstanding relatively high temperatures. In one aspect of the transfer hose 700, the liner 710 is a distinct layer that is in contact with an inner surface of the corrugated inner tube 702. The liner is configured to improve flow of the hot melt adhesive by minimizing material incompatibility with the inner tube 702. In particular, the liner 710 has a smooth interior surface to facilitate fluid flow and prevent material incompatibility issues between the transferred media and the metal inner tube 702. For instance, the liner 710 prevents material from becoming lodged within grooves of the interior corrugations of the inner tube 702.

The hose 700 may further comprise an outer covering 706. The outer covering 706 may be a multi-layered structure having a heating tape sublayer, an insulation sublayer, and/or a protective sublayer, which are not shown. The heating tape serves to provide uniform conduction heating to the hot melt adhesive hose. The insulation layer, which may include but is not limited to aramid felt insulation or fiber glass insulation, serves to control heat loss and may also improve chemical and moisture resistance. The protective layer, which principally serves to protect the hose and other inner component/layers from damage caused by physical abuse, may include, but is not limited to, a durable polymer such as aramid sheathing.

Each sublayer of the outer covering is a separate and distinct layer. For instance, the heating tape sublayer is in contact with an outer surface of the structural layer 704 and is covered by the insulation sublayer. The protective sublayer covers the insulation sublayer.

The inner tube 702, the structural layer 704, and/or the heat tape sublayer of the outer covering 706 are in what may be referred to as a "hot zone," which is near or above the temperature of the molten hot melt adhesive. Alternatively, the outer surface of the insulation or the protective sublayers of the outer layer 706 are radially disposed from and are outside the hot zone, and are thus subjected to a lower temperature.

Figure 17:
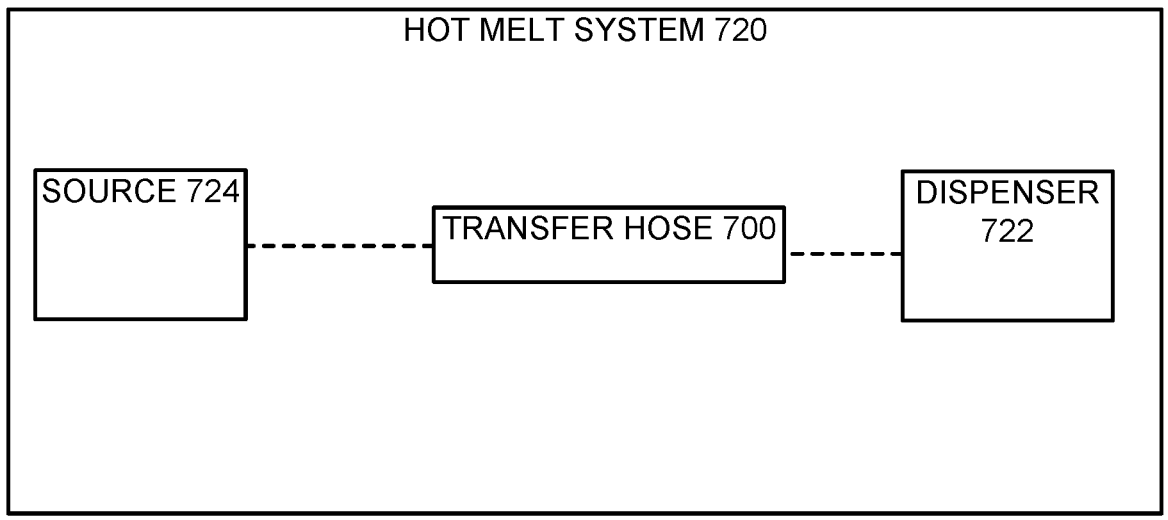
FIG. 17 is a schematic illustration of a hot melt system that includes a dispenser operatively coupled to the hot melt adhesive transfer hose of FIG. 13A.

Further, as schematically represented in FIG. 17, the transfer hose 700 can be used in a hot melt system 720 that includes a dispenser 722 for dispensing hot melt adhesive onto a substrate. The hose 700 may be operatively coupled to the dispenser 722. The hose may also be operatively coupled to a source 724 of liquid hot melt adhesive, such as a melter.

Figure 18:
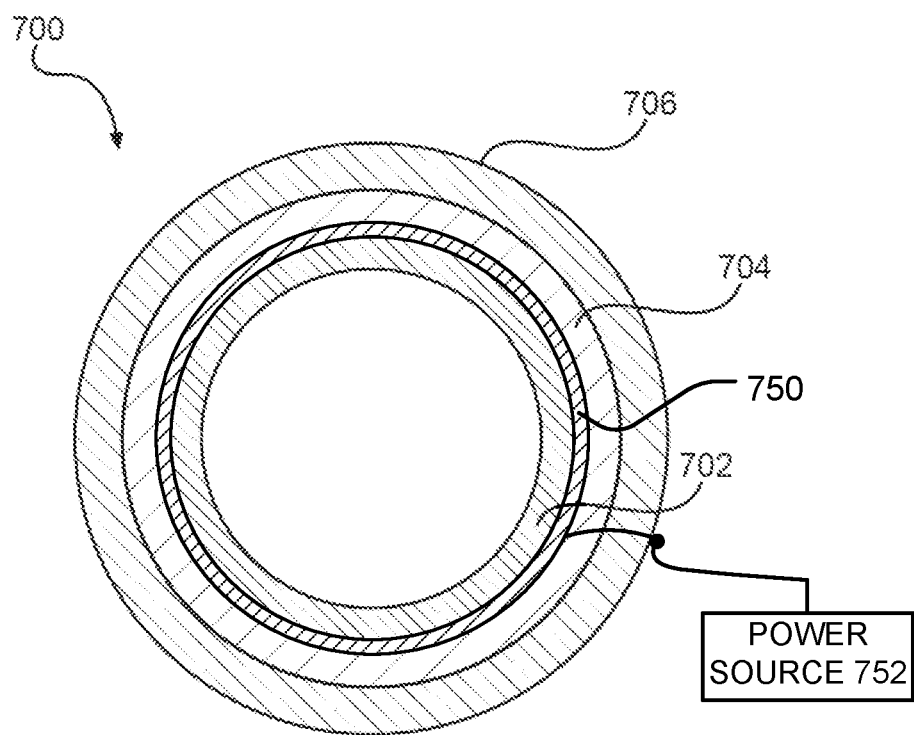
FIG. 18 is a schematic illustration of an end view of a hot melt adhesive transfer hose that includes a heater that is coupled to a power source.

As previously noted above, hot melt adhesives are heated to temperatures sufficient to melt the solid form to a molten, flowable state, which are generally in a range from about 100° C. (about 212° F.) to about 230° C. (about 450° F.). In particular, the transfer hose can further include a heater 750, schematically represented in FIG. 18, for maintaining the hot melt adhesive at a set point. The heater can include at least one heating wire comprising metal such as copper, aluminum, or silver. The at least one heating wire may circumferentially wrap around an exterior surface of the inner core of the hose in a helical pattern, as schematically represented in FIG. 18. Alternatively, the at least one heating wire may be provided on an exterior surface of the inner core in a direction parallel to the longitudinal axis of the inner core. The heater 750 may be electrically coupled to a power source 752, as schematically represented in FIG. 18.

The heater is adapted to be electrically coupled to a power source controlled to maintain the set point to about 450° F. or less for an extended period of time. For example, the flexible metal tube may further transport the hot melt adhesive at a set point temperature at or below about 400° F., at a set point temperature at or below about 350° F., or at a set point temperature at or above about 250° F. A sensor can further be provided on the heater, or alternatively, within the hose, for measuring the set point temperature.

Additionally, it was observed that the metal barrier layer 702 unexpectedly prevented the hot melt adhesive from charring within the hose 700 at certain temperatures for extended periods of time. Specifically, an unknown effect of the barrier layer 702 was observed, in which no charring of hot melt adhesive occurred for at least ninety-six hours when the adhesive was heated to a set point temperature in the range of about or greater than 250° F. up to and including about 450° F.

Figure 16:
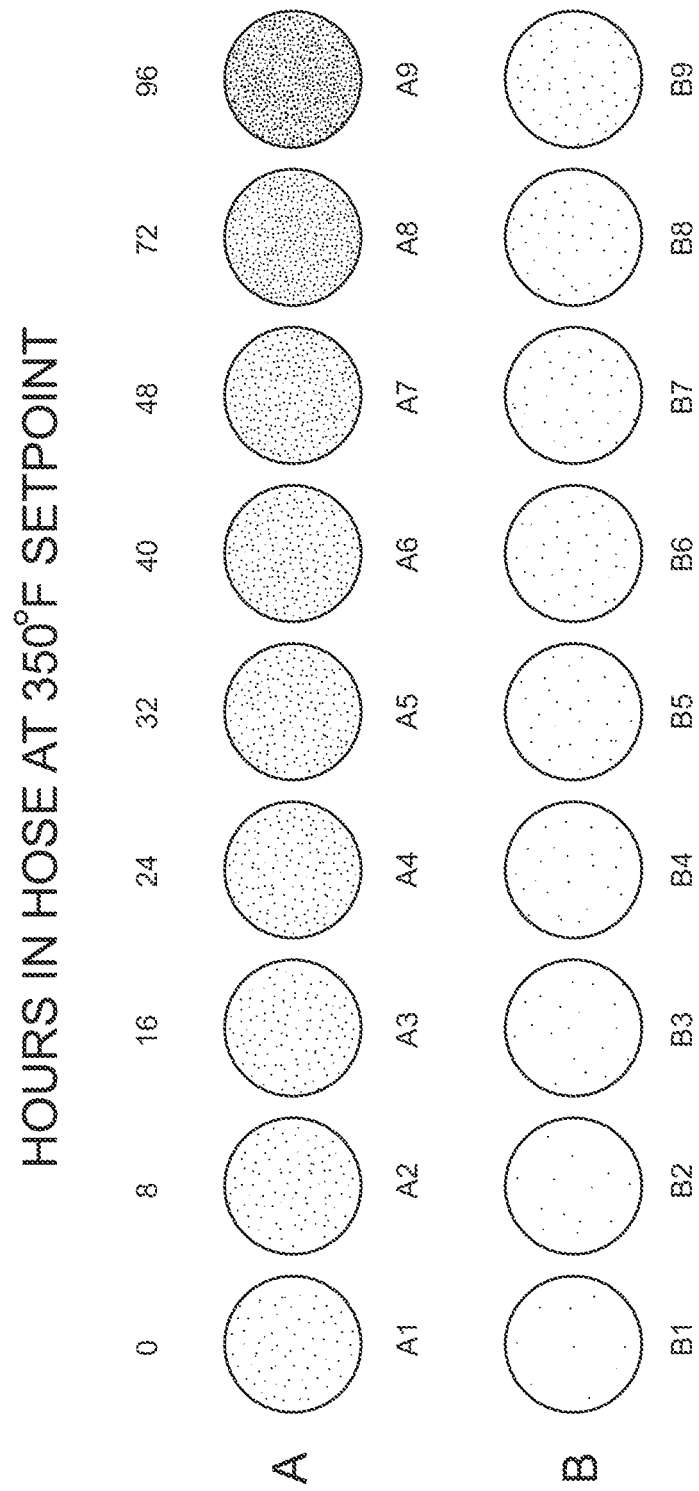
FIG. 16 is an illustration comparing the amount of char formed in hot melt adhesive over time from using a competitor's transfer hose compared to the transfer hose of the present disclosure.

Referring to FIG. 16, an example of the observed discoloration over time of common hot melt adhesive (such as Technomelt® Supra 614C by Henkel) in a competitor's hot melt adhesive transfer hose is shown in line A, as compared to the observed discoloration over time of the hot melt adhesive in the transfer hose 700 of the present disclosure is shown in line B. As a comparative standard, the hot melt adhesive was maintained at a setpoint of 350° F. in both the competitor's transfer hose and the present disclosure's transfer hose 700. Further, the color of the adhesive was observed every eight hours over a period of ninety-six total hours.

As illustrated, the extent of discoloration of hot melt adhesive in the competitor's transfer hose increased greatly over time. For example, the sample of adhesive A9 in the competitor's transfer hose at ninety-six hours was significantly discolored and contained a substantial amount of char. Conversely, the sample of adhesive B9 in the transfer hose of the present disclosure at ninety-six hours was not significantly discolored and contained no significant amount of char formation. As illustrated, the sample of adhesive B9 in the transfer hose of the present disclosure at ninety-six hours had substantially the same color as the sample of adhesive B1 in the transfer hose of the present disclosure at startup.

Moreover, as shown in FIG. 16, an unknown effect of the hose 700 is that there is no significant discoloration and charring of adhesive at 350° F. within the hose at eight hours (B2), sixteen hours (B3), twenty-four hours (B4), thirty-two hours (B5), forty hours (B6), forty-eight hours (B7), seventy-two hours (B8) and ninety-six hours (B9). More particularly, the metal barrier layer 702 unexpectedly resulted in less than 1.0% char formation at 24 hours. Similarly, use of the metal barrier layer 702 unexpectedly resulted in less than 1.0% char formation at 48 hours, at 72 hours, and even at 96 hours, as shown in FIG. 16. Conversely, as shown in FIG. 16, the adhesive inside the competitor's hose displayed significant discoloration and charring at eight hours (A2). The severity of discoloration and charring within the competitor's hose worsened at sixteen hours (A3), twenty-four hours (A4), thirty-two hours (A5), forty hours (A6), forty-eight hours (A7), seventy-two hours (A8), and ninety-six hours (A9).

With reference to FIG. 17, an apparatus 800 for melting and dispensing a hot melt adhesive is provided. The apparatus comprises a chamber 802 for receiving a solid form of the hot melt adhesive; a heating device 804 coupled to the chamber and configured to receive the hot melt adhesive for liquefying the solid form of the hot melt adhesive; and the multi-layered hot melt adhesive transfer hose 806 fluidly coupled to the heating device.

Figure 19:
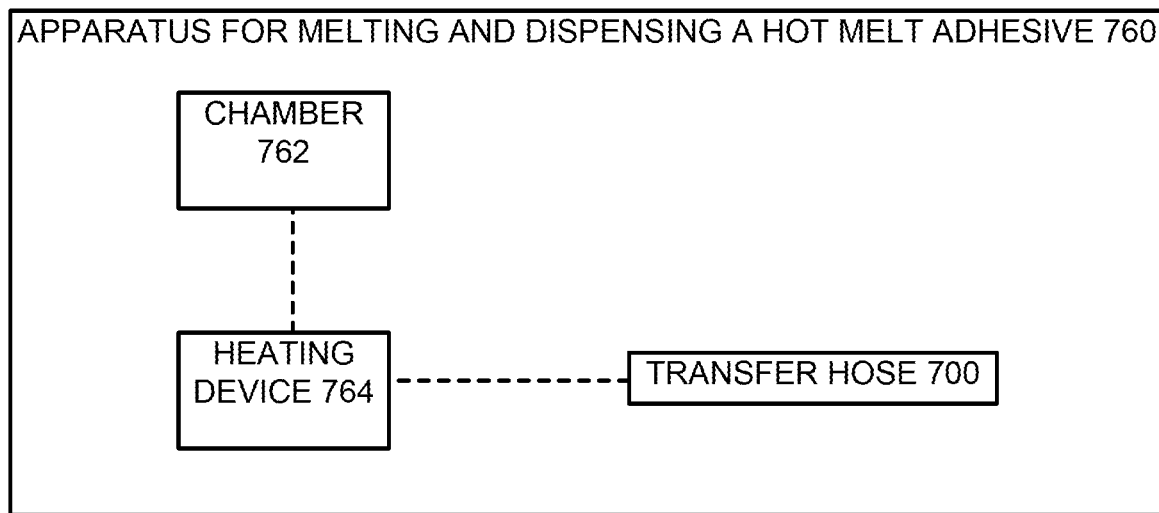
FIG. 19 is a schematic illustration of an apparatus for melting and dispensing a hot melt adhesive, including the hot melt adhesive transfer hose of FIG. 13A coupled to a heating device that is coupled to a chamber.

FIG. 19 schematically illustrates an apparatus for melting and dispensing a hot melt adhesive 760. The apparatus 760 comprises a chamber 762 for receiving a solid form of the hot melt adhesive, a heating device 764 coupled to the chamber 762 and configured to receive the hot melt adhesive for liquefying the solid form of the hot melt adhesive, and the multi-layered hot melt adhesive transfer hose 700 fluidly coupled to the heating device 764.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination. The present disclosure is therefore not limited to the specific details, representative apparatus and methods and illustrative examples shown and described. Instead, the present disclosure is intended to cover such alternatives, modifications, and equivalents without departing from the spirit and scope of the application as defined by the appended claims.

What is claimed is:

1. A multi-layered hot melt adhesive transfer hose, comprising:
   a metal inner tube for transporting heated liquid hot melt adhesive and forming an impermeable barrier layer configured to prevent an ingress of oxygen from passing through the metal inner tube and into the heated liquid hot melt adhesive, whereby the impermeable barrier layer comprises a metal that forms the metal inner tube and is configured to prevent an ingress of oxygen from passing through the metal inner tube and into the heated liquid hot melt adhesive;
   the metal inner tube forming a structural layer configured to withstand a fluid pressure;
   an outer covering overlaying an exterior surface of the structural layer; and
   a heater for maintaining the heated liquid hot melt adhesive at a set point, wherein the heater is adapted to be electrically coupled to a power source controlled to maintain the set point to about 450° F. or less for an extended period of time.

2. The hose of claim 1, wherein the metal inner tube is a flexible metal tube.

3. The hose of claim 2, wherein the metal inner tube is a metal tape.

4. The hose of claim 2, wherein the metal inner tube comprises aluminum.

5. The hose of claim 2, wherein the metal inner tube comprises a plurality of seamless corrugations.

6. The hose of claim 2, further comprising a liner disposed along an inner surface of the metal inner tube.

7. The hose of claim 6, wherein the liner comprises a heat stable polymeric material configured to improve flow of the heated liquid hot melt adhesive through the metal inner tube.

8. The hose of claim 6, wherein the liner includes a smooth interior surface to facilitate fluid flow and prevent material incompatibility between the heated liquid hot melt adhesive and the metal inner tube.

9. The hose of claim 1, further comprising a structural layer made of a braided jacket.

10. The hose of claim 9, further comprising a structural layer made of two overlapping braided jackets.

11. The hose of claim 1, wherein the outer covering has a multi-layered structure overlaying, covering, and in direct contact with an exterior surface of the structural layer.

12. The hose of claim 11, wherein the outer covering further comprises a heating tape sublayer, an insulation sublayer covering the heating tape sublayer, and a protective sublayer covering the insulation sublayer.

13. The hose of claim 1, wherein the metal inner tube comprises a core and a metallic coating applied to the core.

14. An apparatus for melting and dispensing a hot melt adhesive, the apparatus comprising:
   a chamber for receiving a solid form of the hot melt adhesive;
   a heating device coupled to said chamber and configured to receive the hot melt adhesive for liquefying the solid form of the hot melt adhesive; and
   the multi-layered hot melt adhesive transfer hose of claim 1 fluidly coupled to the heating device.

15. A hot melt system, comprising:
   dispenser for dispensing hot melt adhesive onto a substrate; and
   the hose of claim 1 operatively coupled to a source of liquid hot melt adhesive and the dispenser.

16. The hot melt system of claim 15, wherein the source of liquid hot melt adhesive is a melter.

17. A multi-layered hot melt adhesive transfer hose, wherein at least one of the layers is an oxygen barrier layer that prevents or minimizes an ingress of oxygen into a conduit of the hose that transports a molten hot melt adhesive.

18. The hose of claim 17, further comprising:
   an inner tube that conveys the hot melt adhesive in a molten state, wherein the inner tube has a first inner surface and a first outer surface;
   a structural layer overlaying the first outer surface of the inner tube, wherein the structural layer is configured to withstand a fluid pressure and has a second inner surface and a second outer surface; and
   an outer covering overlaying the second outer surface of the structural layer, wherein the outer covering has a third inner surface and a third outer surface,
   wherein the oxygen barrier layer is in direct contact with the first inner surface or the first outer surface of the inner tube the second inner surface or the second outer surface of the structural layer, or the third inner surface or the third outer surface of the outer covering.

19. The hose of claim 18, wherein the outer covering further comprises a heating tape sublayer, an insulation sublayer, and a protective sublayer, and wherein the oxygen barrier layer is in direct contact with an outer surface of the insulation sublayer, an inner surface of the protective sublayer, or an outer surface of the protective sublayer.

20. The hose of claim 19, wherein the oxygen barrier layer is fluidly coupled with a one-way valve to accommodate thermal expansion of any trapped gases upon heating.

21. The hose of claim 19, wherein the oxygen barrier layer has an expandable configuration to accommodate thermal expansion of any trapped gases upon heating.

22. The hose of claim 17, wherein the oxygen barrier layer is selected from the group consisting of a metallic material, a polymeric material, and a combination thereof.

23. The hose of claim 17, wherein the oxygen barrier layer comprises a metallic layer comprising aluminum.

24. The hose of claim 17, wherein the oxygen barrier layer comprises a polymeric layer selected from the group consisting of an extruded polymeric layer, a plasma polymerized polymer layer, and a combination thereof.

25. The hose of claim 17, further comprising:
   an inner tube that conveys the hot melt adhesive in a molten state;
   a structural layer overlaying the inner tube; and
   an outer covering overlaying the structural layer,
   wherein the inner tube comprises a composite material including a heat stable polymer and an inorganic additive, and wherein the inorganic additive decreases oxygen permeability of the inner tube.

26. The hose of claim 25, wherein the inorganic additive is selected from the group consisting of clay, silicates and silicas, pillared materials, metal salts, nanoplatelets, and mixtures thereof.

27. An apparatus for melting and dispensing a hot melt adhesive, the apparatus comprising:
   a chamber for receiving a solid form of the hot melt adhesive;
   a heating device coupled to said chamber and configured to receive the hot melt adhesive for liquefying the solid form of the hot melt adhesive; and
   the multi-layered hot melt adhesive transfer hose of claim 17 fluidly coupled to the heating device.

28. The hose of claim 17, wherein the oxygen barrier layer comprises a metal that is configured to prevent an ingress of oxygen from passing through the conduit of the hose that transports the molten hot melt adhesive.

\* \* \* \* \*